United States Patent
Fagin et al.

(10) Patent No.: US 7,689,581 B2
(45) Date of Patent: Mar. 30, 2010

(54) SEQUENTIAL COMPOSITION OF SCHEMA MAPPINGS

(75) Inventors: Ronald Fagin, Los Gatos, CA (US); Phokion Gerasimos Kolaitis, Los Altos, CA (US); Lucian Popa, San Jose, CA (US); Wang-Chiew Tan, San Jose, CA (US); Cong Yu, Ann Arbor, MI (US)

(73) Assignee: International Business Machines Corporation, Armonk, NY (US)

( * ) Notice: Subject to any disclaimer, the term of this patent is extended or adjusted under 35 U.S.C. 154(b) by 248 days.

(21) Appl. No.: 11/334,582

(22) Filed: Jan. 18, 2006

(65) Prior Publication Data
US 2007/0168381 A1    Jul. 19, 2007

(51) Int. Cl.
    G06F 7/00 (2006.01)
(52) U.S. Cl. .................................... 707/102
(58) Field of Classification Search ............. 707/102
    See application file for complete search history.

(56) References Cited

U.S. PATENT DOCUMENTS

2004/0216030 A1   10/2004   Hellman et al.

2006/0136463 A1 *   6/2006   Nash et al. ............. 707/102

OTHER PUBLICATIONS

Ronald Fagin, Phokion Kolaitis, Lucian Pupa, Wang-Chiew Tan, Composing Schema Mappings: Second-Order Dependencies to the Rescue, ACM PODS, Jun. 14-16, 2004.*
Nash, et al.; Composition of Mappings Given by Embedded Dependencies; PODS 2005 Jun. 13-15, 2005, Baltimore, Maryland, USA; ACM Press, New York, NY; pp. 172-183; 1-59593-060-0.

* cited by examiner

Primary Examiner—Tony Mahmoudi
Assistant Examiner—Jensen Hu
(74) Attorney, Agent, or Firm—Schmeiser, Olsen & Watts

(57) ABSTRACT

A method for generating a schema mapping. A provided mapping $M_{12}$ relates schema $S_1$ to schema $S_2$. A provided mapping $M_{23}$ relates schema $S_2$ to schema $S_3$. A mapping $M_{13}$ is generated from schema $S_1$ to schema $S_3$ as a composition of mappings $M_{12}$ and $M_{23}$. Mappings $M_{12}$, $M_{23}$, and $M_{13}$ are each expressed in terms of at least one second-order nested tuple-generating dependency (SO nested tgd). Mapping $M_{13}$ does not expressly recite any element of schema $S_2$. At least one schema of the schemas $S_1$ and $S_2$ may comprise at least one complex type expression nested inside another complex type expression. Mapping $M_{13}$ may define the composition of the mappings $M_{12}$ and $M_{23}$ with respect to a relationship semantics or a transformation semantics.

18 Claims, 14 Drawing Sheets

Schema Evolution Scenario: Target Evolution

Schema Evolution Scenario: Source Evolution

```
tgt = Rcd [
    students =
    {
        Rcd [sid=001, name=Mary, courses={ Rcd [course=CS120, eval_key=E_1] } ],
        Rcd [sid=005, name=John, courses={ Rcd [course=CS500, eval_key=E_2] } ],
        Rcd [sid=001, name=Mary, courses={ Rcd [course=CS120, eval_key=E_3] } ],
        Rcd [sid=001, name=Mary, courses={ Rcd [course=CS200, eval_key=E_4] } ]
    },
    evaluations =
    {
        Rcd [eval_key=E_1, grade=A, evaluation_file=null],
        Rcd [eval_key=E_2, grade=B, evaluation_file=null],
        Rcd [eval_key=E_3, grade=null, evaluation_file=file01],
        Rcd [eval_key=E_4, grade=null, evaluation_file=file07]
    }
]
```

I →

```
tgt = Rcd [
    students =
    {
        Rcd [sid=001, name=Mary, courses=
            { Rcd [course=CS120, eval_key=E_1],
              Rcd [course=CS120, eval_key=E_3],
              Rcd [course=CS200, eval_key=E_4] } ],
        Rcd [sid=005, name=John, courses=
            { Rcd [course=CS500, eval_key=E_2] } ],
    },
    evaluations =
    {
        Rcd [eval_key=E_1, grade=A, evaluation_file=file01],
        Rcd [eval_key=E_2, grade=B, evaluation_file=null],
        Rcd [eval_key=E_3, grade=null, evaluation_file=null],
        Rcd [eval_key=E_4, grade=null, evaluation_file=file07]
    }
]
```

Examples of Instances I (on the Left) and I' (on the right).

Schemas $S_1$ and $S_2$, Together With Schema Mapping $M_{12} = \{m_1, m_2\}$

An Example of a Schema Mapping to Illustrate a Skolem Function.

Illustration of the Chase Process (source instance $I_1$ over schema $S_1$, schema mapping $M_{12} = \{m_1, m_2\}$ from $S_1$ to $S_2$, and resulting target instance $I_2'$ over $S_2$).

$I'_2$                            $I_2$ tgt.students
    001   Mary   $S_1$
    005   John   $S_2$
    001   Mary   $S_3$
    001   Mary   $S_4$ tgt.students
    001   Mary   S
    005   John   $S_2$ $^{S_1}CS120\ E_1$    $^{S_3}CS120\ E_3$ $^{S_2}CS500\ E_2$    $^{S_4}CS200\ E_4$

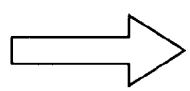

$^S\ \begin{matrix}CS120\ E_1\\CS120\ E_3\\CS200\ E_4\end{matrix}$    $^{S_2}CS500\ E_2$ tgt.evals
    $E_1$   A   $F_1$
    $E_2$   B   $F_2$
    $E_3$   $G_3$   file01
    $E_4$   $G_4$   file07 tgt.evals
    $E_1$   A   $F_1$
    $E_2$   B   $F_2$
    $E_3$   $G_3$   file01
    $E_4$   $G_4$   file07

Instance $I_2$' is Transformed into the Instance $I_2$ in Partitioned Normal Form (PNF)

FIG. 7

A Sequence of Schema Mapping $M_{12}$ and $M_{23}$: $M_{12}=\{m_1, m_2\}$ from Schema $S_1$ to Schema $S_2$, and $M_{23}=\{m_3\}$ from Schema $S_2$ to Schema $S_3$.

(De-Nesting)

for ... ($x_i$ in $X_i$) ... (g in { for ($y_1$ in $Y_1$) ... ($y_k$ in $Y_k$) where B return r }) ... ($z_j$ in $Z_j$) ...
  where $B_1$
  exists ($y_1$ in $g_1^t$) ... ($y_m$ in $g_m^t$)
    where $B_2$
  with ($e_1^s = e_1^t$) and ... and ($e_k^s = e_k^t$)
    ⇓
for ... ($x_i$ in $X_i$) ... ($y_1$ in $Y_1$) ... ($y_k$ in $Y_k$) ... ($z_j$ in $Z_j$[g r]) ...
  where $B_1$[g r] and B
  exists ($y_1$ in $g_1^t$) ... ($y_m$ in $g_m^t$)
    where $B_2$
  with ($e_1^s$ [g r] = $e_1^t$) and ... and ($e_k^s$ [g r] = $e_k^t$)

De-nesting Rewrite Rule:. In general, if e is an expression, the notation e[g→r] means the expression e where every occurrence of the variable g is substituted by the expression r.

FIG. 10

(Union Separation) – generate two
mappings from one for ... (g in $X_1 \cup X_2$) ...
        where $B_1$
        exists ($y_1$ in $g_1^t$) ... ($y_m$ in $g_m^t$)
          where $B_2$
          with ($e_1^s = e_1^t$) and ... and ($e_k^s = e_k^t$)
$\Rightarrow$
    for ... (g in $X_1$) ...
        where $B_1$
        exists ($y_1$ in $g_1^t$) ... ($y_m$ in $g_m^t$)
          where $B_2$
          with ($e_1^s = e_1^t$) and ... and ($e_k^s = e_k^t$)
,
    for ... (g in $X_2$) ...
        where $B_1$
        exists ($y_1$ in $g_1^t$) ... ($y_m$ in $g_m^t$)
          where $B_2$
          with ($e_1^s = e_1^t$) and ... and ($e_k^s = e_k^t$)

(Record Projection)
    [ ..., $l_i = e_i$ ,...] . $l_i \Rightarrow e_i$ (Case Reduction)
    case <$l_i = e_i$>   $l_i \Rightarrow e_i$
    case <$l_i = e_i$>   $l_k \Rightarrow \perp$  (i.e.,
    the current rewriting is abandoned), if $l_i \neq l_k$ Rewrite Rules: Union Separation, Record Projection, and Case Reduction.

FIG. 11

SEQUENTIAL COMPOSITION OF SCHEMA MAPPINGS

BACKGROUND OF THE INVENTION

1. Technical Field

The present invention relates to a method and system for generating a schema mapping that composes two given schema mappings.

2. Related Art

Compositional mappings between schemas may be expressed as constraints in logic-based languages. However, there is no known compositional mapping that applies to Extensible Markup Language (XML) schemas. Accordingly, there is a need for a compositional mapping that applies to XML schemas.

SUMMARY OF THE INVENTION

The present invention provides a method for generating a schema mapping, said method comprising:

providing a mapping $M_{12}$ from a schema $S_1$ to a schema $S_2$, said mapping $M_{12}$ relating the schema $S_2$ to the schema $S_1$, said schema $S_1$ and schema $S_2$ each comprising one or more elements, said mapping $M_{12}$ being expressed in terms of at least one second-order nested tuple-generating dependency (SO nested tgd);

providing a mapping $M_{23}$ from the schema $S_2$ to a schema $S_3$, said mapping $M_{23}$ relating the schema $S_3$ to the schema $S_2$, said schema $S_3$ comprising one or more elements, said mapping $M_{23}$ being expressed in terms of at least one SO nested tgd; and generating a mapping $M_{13}$ from the schema $S_1$ to the schema $S_3$, said mapping $M_{13}$ relating the schema $S_3$ to the schema $S_1$, said mapping $M_{13}$ being expressed in terms of at least one SO nested tgd that does not expressly recite any element of the schema $S_2$, said generating the mapping $M_{13}$ comprising generating the mapping $M_{13}$ as a composition of the mappings $M_{12}$ and $M_{23}$, wherein at least one schema of the schemas $S_1$ and $S_2$ comprises at least one complex type expression nested inside another complex type expression.

The present invention provides a method for generating a schema mapping, said method comprising:

providing a mapping $M_{12}$ from a schema $S_1$ to a schema $S_2$, said mapping $M_{12}$ relating the schema $S_2$ to the schema $S_1$, said schema $S_1$ and schema $S_2$ each comprising one or more elements, said mapping $M_{12}$ being expressed in terms of at least one second-order nested tuple-generating dependency (SO nested tgd);

providing a mapping $M_{23}$ from the schema $S_2$ to a schema $S_3$, said mapping $M_{23}$ relating the schema $S_3$ to the schema $S_2$, said schema $S_3$ comprising one or more elements, said mapping $M_{23}$ being expressed in terms of at least one SO nested tgd; and generating a mapping $M_{13}$ from the schema $S_1$ to the schema $S_3$, said mapping $M_{13}$ relating the schema $S_3$ to the schema $S_1$, said mapping $M_{13}$ being expressed in terms of at least one SO nested tgd that does not expressly recite any element of the schema $S_2$, said generating the mapping $M_{13}$ comprising generating the mapping $M_{13}$ as a composition of the mappings $M_{12}$ and $M_{23}$, wherein the mapping $M_{13}$ defines the composition of the mappings $M_{12}$ and $M_{23}$ with respect to a transformation semantics.

The present invention advantageously provides a compositional mapping that applies to XML schemas.

BRIEF DESCRIPTION OF THE DRAWINGS

FIG. 3 illustrates two instances over a schema, in accordance with embodiments of the present invention.

FIG. 7 illustrates transforming an intermediate instance into a final instance in Partitioned Normal Form (PNF), in accordance with embodiments of the present invention.

FIG. 10 illustrates de-nesting rewrite rules, in accordance with embodiments of the present invention.

FIG. 11 illustrates union separation, record projection, and case reduction rewrite rules, in accordance with embodiments of the present invention.

DETAILED DESCRIPTION OF THE INVENTION

Figure 1:
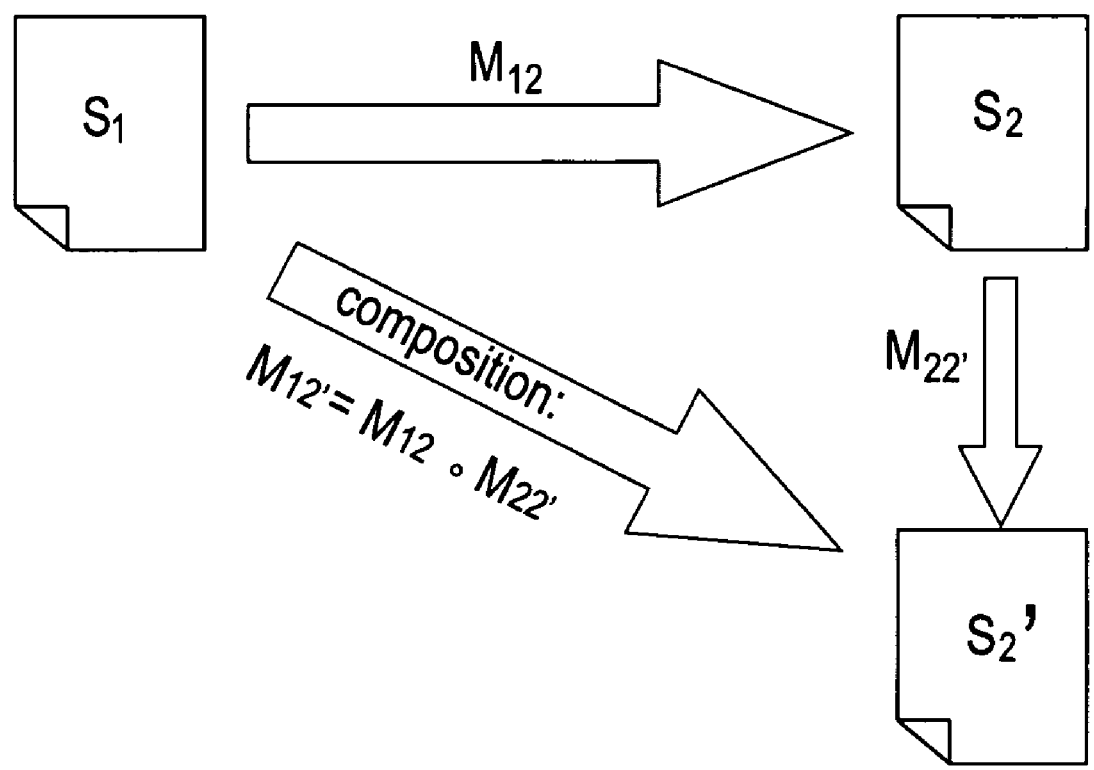
FIGS. 1 and 2 depict diagrammatically how mapping composition can be applied for target evolution and source evolution, respectively, in accordance with embodiments of the present invention.

A schema is a set of rules describing how stored information is organized. The stored information may be in the form of data structures (e.g., databases, tables, files, etc.). A schema mapping from a first schema to a second schema may define a composition of two sequential mappings with respect to a relationship semantics or to a transformation semantics. A schema mapping pertaining to a relationship semantics describes relationships between the first schema and the second schema. A schema mapping pertaining to a transformation semantics describes a transformation of data from the first schema to the second schema.

The present invention addresses the problem of sequential composition of two schema mappings. Given a mapping $M_{12}$ describing a relationship between a schema $S_1$ and a schema $S_2$, and a mapping $M_{23}$ describing a relationship between schema $S_2$ and schema $S_3$, the present invention derives a mapping $M_{13}$ that describes the implied relationship between schema $S_1$ and $S_3$, without referring to schema $S_2$ in the mapping $M_{13}$. This problem is of importance in areas such as information integration and schema evolution, where tools are needed to manipulate and reason about mappings between relational database schemas and/or mapping between Extensible Markup Language (XML) schemas. Mappings between schemas may be expressed as constraints in a logic-based language; these constraints specify how data stored under one schema relate to data stored under another schema.

The present invention describes a system that implements two possible semantics for the result of composing two sequential mappings that are both useful in practice. These two semantics are a relationship semantics and a transformation semantics. The relationship semantics is more general than the transformation semantics and handles composition of mappings when mappings are used to describe arbitrary relationships between schemas. The transformation semantics applies only when mappings are used to describe transformations for exchanging data from a source schema to a target schema. The present invention provides algorithms for composing sequential schema mappings under both the relationship semantics and the transformation semantics. In effect, this disclosure claims two different systems for sequential composition of schema mappings: one supporting the relationship semantics, and one supporting the transformation semantics.

The remainder of the Detailed Description of the Invention is divided into the following sections:

1. Applications

2. Basic Terms, Concepts, and Notation; and

3. Algorithm 1: Composition with Respect to Relationship Semantics

4. Algorithm 2: Composition with Respect to Transformation Semantics

5. Computer System

1. Applications

Applications of the present invention comprise schema evolution, optimization of data transformation flows, and mapping deployment.

1.1 Schema Evolution

Schema mappings are abstractions or models for the more concrete scripts or queries that can be used to transform data from one schema to another. In other words, given a schema mapping $M_{12}$ from $S_1$ to $S_2$, a human or a software tool can generate a script or query or program to transform a database or a document instance that conforms to schema $S_1$ into a database or document instance that conforms to schema $S_2$. However, when schema evolution occurs, such as when schema $S_1$ changes to a new schema $S_1'$ or schema $S_2$ changes to a new schema $S_2'$, the earlier scripts or queries or programs from $S_1$ to $S_2$ are no longer applicable and new scripts or queries ones are generated.

Figure 2:
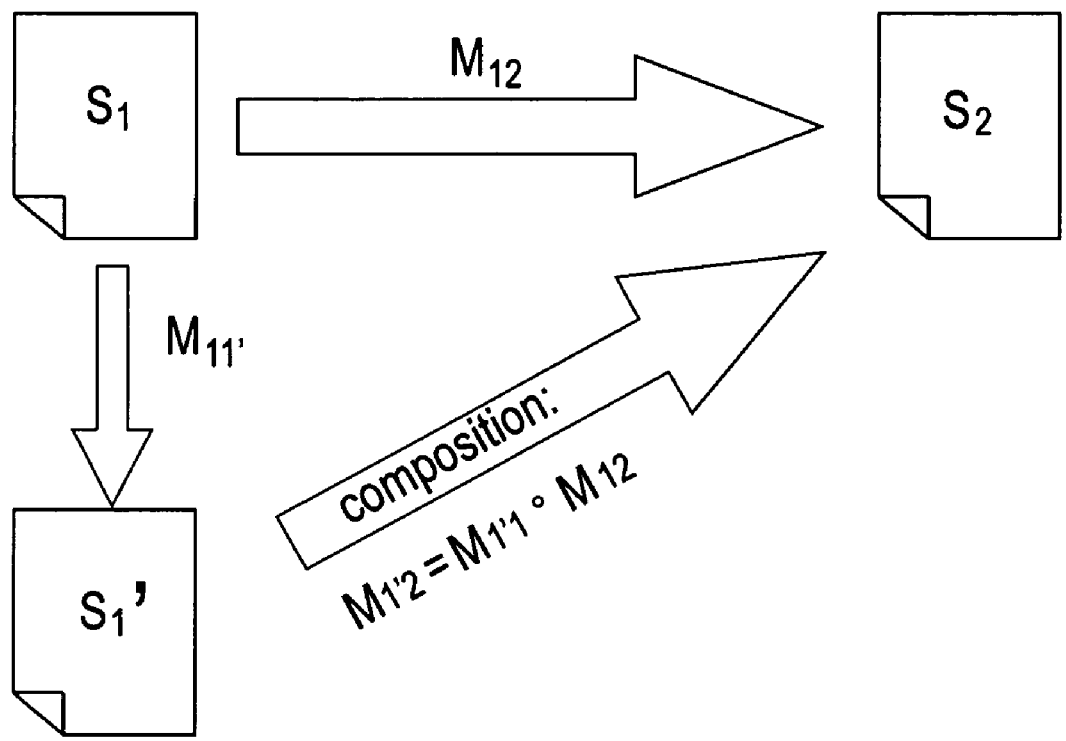

The present invention can be used in solving the above problem by employing any one of the two mapping composition algorithms claimed. FIGS. 1 and 2 depict diagrammatically how mapping composition can be applied for target evolution and source evolution, respectively, in accordance with embodiments of the present invention. FIG. 1 shows the case of target schema evolution (the target schema $S_2$ changes to $S_2'$), while FIG. 2 shows the case of source schema evolution (the source schema $S_1$ changes to $S_1'$).

In FIG. 1 for target schema evolution, the first step after the mapping $M_{12}$ has been previously specified is to generate a schema mapping $M_{22'}$ from $S_2$ to $S_2'$. The second step is to apply mapping composition for $M_{12}$ and $M_{22'}$ to obtain a new schema mapping $M_{12'}$. This new schema mapping $M_{12'}$ can then be used to guide the generation of the new scripts, queries or programs that transform data from $S_1$ to the new schema $S_2'$.

In FIG. 2 for source schema evolution, the first step after the mapping $M_{12}$ has been previously specified is to generate a schema mapping $M_{1'1}$ from $S_1'$ to $S_1$. The second step is to apply mapping composition for $M_{1'1}$ and $M_{12}$ to obtain a new schema mapping $M_{1'2}$. This new schema mapping $M_{1'2}$ can then be used to guide the generation of the new scripts, queries or programs that transform data from the new schema $S_1'$ to $S_2$.

Both source schema evolution and target schema evolution may be implemented with respect to a transformation semantics.

1.2 Optimization of Data Transformation Flows

A data transformation flow is a sequence or, more generally, a directed graph, where the nodes of the graph are schemas and the edges are transformations or mappings between the schemas. Data transformation flows are the common abstraction for ETL (extract-transform-load) commercial systems. The methods of the current invention can be used to compose two schema mappings that appear sequentially in the data transformation flow and, thus, eliminate intermediate stages in the graph, with obvious performance benefits.

Furthermore, the repeated application of composition can yield an end-to-end schema mapping that eliminates all the intermediate nodes in the graph. This results in a high-level view of the entire data transformation flow; this high-level view, in turn, may allow for subsequent be re-optimization of the data flow graph into a different, but equivalent, data flow graph, with better performance.

1.3 Mapping Deployment

Schema mappings may be designed at a logical level. More concretely, a schema mapping $M_{ST}$ may be designed between two logical schemas S and T. At deployment time however, such mapping needs to be deployed (usually by a different person) between two physical schemas S' and T' that are not exactly the same as the logical schemas. Once mappings between the physical and the logical schemas are obtained (e.g., mappings $M_{S'S}$ from S' to S, and $M_{TT'}$ from T to T'), the methods of the current invention can be applied to generate a physical schema mapping $M_{S'T'}$ from S' to T' by composing $M_{S'S}$ with the "logical" mapping $M_{ST}$ and then with $M_{TT'}$.

2. Basic Terms, Concepts, and Notation 2.1 Schemas and Instances

The schemas $S_1$, $S_2$, and $S_3$ can be any schema expressed in a language of nested elements of different types that include atomic types, record types, choice types and set types respectively corresponding to atomic elements, record elements, choice elements, and set elements. This language is called herein the nested relational schema language and can encode relational database schemas as well as XML and hierarchical schemas.

Atomic types (or primitive types) expressions are the usual data types: String, Int, Float, etc. Record types are used to encapsulate together groups of elements which in turn can be atomic types or complex types expressions. A complex type expression is a non-atomic type (e.g., a set, record, or choice type) expression. For example, RCD [ssn: Int, name: String] represents a record type whose components are ssn (social security number) and name. Another example is RCD [ssn: Int, person: RCD [name: String, address: String]], which denotes a record with two components: ssn, of integer type, and person, of record type (with two components: name and address, of string type). Set types are used to represent collections of elements or records. For example, SET of RCD [ssn: Int, person: RCD [name: String, address: String]] will represent a collection of records, where each record will denote a person. Choice types are used to represent elements that can be one of multiple components. For example, CHOICE [name: String, full_name: RCD [firstName: string, lastName: String]] will represent elements that can include either a name component (of type String), or of a full_name component (which itself consists of firstName and last-Name).

A schema is a collection of roots, that is, names with associated nested types. The following are examples of nested relational schemas $S_1$, $S_2$, and $S_3$:

```
S₁ = {src₁: RCD [students: SET of RCD [sid: Int,
                                name: String,
                                course: String,
                                grade: Char
                                ]
                ],
      src₂: RCD [students: SET of RCD [sid: Int,
                                name: String,
                                course_code: Int
                                ],
                 courses: SET of RCD [course_code: Int,
                                course: String,
                                evaluation_file: String
                                ]
                ]
     }
S₂ = {tgt: RCD [students: SET of RCD [sid: Int,
                                name: String,
                                courses: SET of RCD [course: String,
                                                     eval_key: Int
                                                     ]
                                ],
                evaluations: SET of RCD [eval_key: Int,
                                grade: Char,
                                evaluation_file: String
                                ]
               ]
     }
S₃ = {new_tgt: RCD [students: SET of RCD [sid: Int,
                                results: SET of RCD [
                                                     eval_key: Int
                                                     ]
                                ],
                    evaluations: SET of RCD [eval_key: Int,
                                grade: Char,
                                evaluation_file: String
                                ]
                   ]
     }
```

In this example, the schemas represent information about students (student id or sid, name), courses they take, and the results (grade, evaluation_file) that are assigned to students for each course. The first schema $S_1$ contains two different roots, $src_1$ and $src_2$, which are complementary sources of information about students. The second schema $S_2$ is a reorganization of the first schema that merges the information under one root, tgt. The third schema $S_3$ has one root new_tgt and can be thought of an evolution of the second schema $S_2$, where individual courses are no longer of interest but the results still are.

Given a schema, any element of set type that is not nested inside other set type (directly or indirectly) is referred to as a top-level set-type element. For example, in the schema $S_2$ above, "students" and "evaluations" are top-level set-type elements, while "courses" is not (since it is nested inside the set type associated with "students").

Given a schema S with roots $r_1$ of type $T_1, \ldots, r_n$ of type $T_n$, an instance I over S is a collection of values $v_1, \ldots, v_n$ for the roots $r_1, \ldots, r_n$ of S, such that for each k from 1 to n, $v_k$ is of type $T_k$. For example, FIG. 3 illustrates two instances over the schema $S_2$ shown supra, in accordance with embodiments of the present invention. In FIG. 3, the instances I and I' appear on the left and right, respectively.

2.2 Schema Mappings

Schema mappings are used to specify relationships between schemas. A schema mapping between schema $S_1$ and schema $S_2$ specifies how a database or document instance conforming to $S_1$ relates to a database or document instance conforming to $S_2$. Additionally, a schema mapping can be seen as a specification of how a database or document instance conforming to schema $S_1$ can be transformed into a database or document instance conforming to schema $S_2$.

Schema mappings are expressed in a constraint language called second-order nested tuple-generating dependencies (or SO nested tgds). A SO nested tgd may be characterized by at least one schema of the schemas $S_1$ and $S_2$ comprising at least one complex type expression nested inside another complex type expression.

Each SO nested tgd includes one or more formulas. Each formula includes clauses such as: a for clause, an exists clause, a where clause, and a with clause. The for clause identifies source tuples to which the formula applies. The exists clause identifies tuples that must exist in the target. The where clause describes constraints on the tuples of source and/or target. The with clause describes how values in fields of source and target tuples are matched.

The following is an example of a schema mapping, $M_{12}$, between the schemas $S_1$ and $S_2$ that were illustrated before. $M_{12}$ includes two formulas, $m_1$ and $m_2$, each formula being an SO nested tgd.

Figure 4:
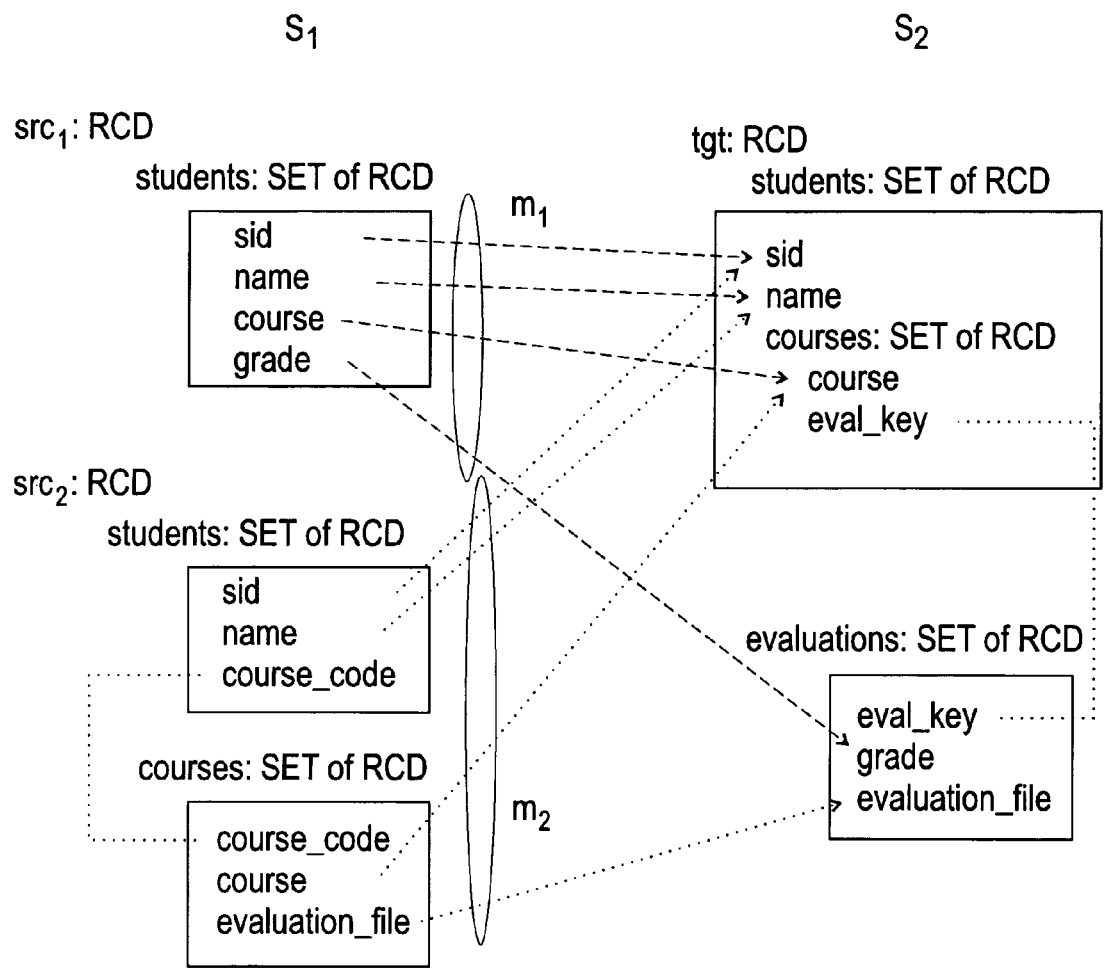
FIG. 4 shows a pictorial view of how formulas in a schema mapping from schema $S_1$ to schema $S_2$ relate elements in schema $S_1$ and elements in schema $S_2$, in accordance with embodiments of the present invention.

$m_1$: for (s in $src_1$.students)
  exists (s' in tgt.students) (c' in s'.courses) (e' in tgt.evaluations)
    where c'.eval_key=e'.eval_key
    with s.sid=s'.sid and s.name=s'.name and
      s.course=c'.course and s.grade=e'.grade
$m_2$: for (s in $src_2$.students) (c in $src_2$.courses)
    where s.course_code=c.course_code
  exists (s' in tgt.students) (c' in s'.courses) (e' in tgt.evaluations)
    where c'.eval_key=e'.eval_key
    with s.sid=s'.sid and s.name=s'.name and
      c.course=c'.course and c.evaluation_file=e'.evaluation_file The meaning of the above formulas for $m_1$ and $m_2$ is as follows. FIG. 4 also shows a pictorial view of how the above formulas for $m_1$ and $m_2$ relate elements in schema $S_1$ and elements in schema $S_2$, in accordance with embodiments of the present invention.

The formula $m_1$ is a constraint asserting, via the exists clause, that for each tuple s that appears in the set "students" under $src_1$ (of $S_1$), there exists a tuple s' in the set "students" under tgt (of $S_2$), a tuple c' in the set "courses" of s', and a tuple e' in the set "evaluations" under tgt.

Moreover, the where clause of $m_1$ specifies that the tuples c' and e' must not be arbitrary but they are constrained so that they have the same "eval_key" field.

Furthermore, the tuples s', c', and e' are also constrained by the with clause of $m_1$: the "sid" and "name" fields of s' must respectively equal (i.e., have the same value of) the "sid" and "name" fields of s, the "course" field of c' must equal the "course" field of s, and the "grade" field of e' must equal the "grade" field of s. The value of "evaluation_file" of e' is left unspecified by $m_1$, due to the fact that $src_1$ does not contain any element that corresponds to an evaluation file.

In general, the with clause of a formula such as $m_1$ will contain a sequence of equalities relating elements in a source schema such as $S_1$ with elements (not necessarily with the same name) in a target schema such as $S_2$. In the case of $m_1$, these equalities are shown pictorially in FIG. 4 as the set of arrows grouped under the name "$m_1$".

The formula $m_2$ is a similar constraint asserting, via the exists clause, that for each tuple s that appears in the set "students" under $src_2$ (of $S_1$) and for each tuple c that appears in the set "courses" under $src_2$, where s and c satisfy the condition that they have the same "course_code" value (as stated in the first where clause of $m_2$), there must exist a tuple s' in the set "students" under tgt (of $S_2$), a tuple c' in the set "courses" of s', and a tuple e' in the set "evaluations" under tgt.

As in $m_1$, the where clause of $m_2$ specifies that the tuples c' and e' must not be arbitrary but they are constrained so that they have the same "eval_key" field. Furthermore, the tuples s', c', and e' are also constrained by the with clause of $m_2$: the "sid" and "name" fields of s' must equal the "sid" and "name" fields of s, the "course" field of c' must equal the "course" field of c, and the "evaluation_file" field of e' must equal the "evaluation_file" field of c. The "grade" of e' is left unspecified by $m_2$, due to the fact that $src_2$ does not contain any element that corresponds to a grade.

As a notational matter, clauses appearing in mapping such as $M_{12}$ are underlined (e.g., for clause, exists clause, where clause, with clause) and may alternatively be denoted in upper case letters (e.g., FOR clause, EXISTS clause, WHERE clause, WITH clause, respectively).

2.3 Mapping Language: General Syntax of SO Nested tgds

In general, given a schema $S_1$ (the source schema) and a schema $S_2$ (the target schema), a nested tgd (m) is a formula of the form:

m: for $(x_1$ in $g_1^s) \ldots (x_n$ in $g_n^s)$
   where $B_1(x_1, \ldots, x_n)$
   exists $(y_1$ in $g_1^t) \ldots (y_m$ in $g_m^t)$
     where $B_2(y_1, \ldots, y_m)$
   with $(e_1^s = e_1^t)$ and $\ldots$ and $(e_k^s = e_k^t)$ where:

1) $x_1, \ldots, x_n, y_1, \ldots, y_n$ are variables (other symbols for variables are x, y, z, $z_1$, etc.).

2) $e_1^s, \ldots e_k^s, e_1^t, \ldots, e_k^t$ are expressions, where in general expressions are defined by the following grammar: e::=x|r|e.A (i.e., an expression can be a variable, a schema root, or a record component of another expression). In the above mapping, $e_1^s, \ldots e_k^s$ are source expressions, that is, they are required to use only variables from the for clause (i.e., $x_1, \ldots, x_n$) and schema roots from the source schema $S_1$. Moreover, $e_1^t, \ldots e_k^t$ are target expressions, that is, they are required to use only variables from the exists clause (i.e., $y_1, \ldots, y_m$) and schema roots from the target schema $S_2$. Furthermore, all the expressions that appear in the with clause must be of atomic type.

3) $g_1^s, \ldots g_n^s, g_1^t, \ldots, g_m^t$ are generators, where in general a generator is defined by the following grammar: g::=$e_1$|case $e_2$ of A (where $e_1$ is an expression of set type and $e_2$ is an expression of a choice type that must include the choice of an A component). In the above mapping, $g_1^s, \ldots g_n^s$ are source generators, that is, they are required to use only variables from the for clause (i.e., $x_1, \ldots, x_n$) and schema roots from the source schema $S_1$. Moreover, $g_1^t, \ldots g_k^t$ are target generators, that is, they are required to use only variables from the exists clause (i.e., $y_1, \ldots, y_m$) and schema roots from the target schema $S_2$. Furthermore, for every i from 1 to n, the ith source generator in the for clause can only use variables $x_1, \ldots, x_{i-1}$. Similarly, for every j from 1 to m, the jth target generator in the exists clause can only use variables $y_1, \ldots, y_{j-1}$.

4) $B_1(x_1, \ldots, x_n)$ and $B_2(y_1, \ldots, y_m)$ are predicates of the form $(e_1 = e_1')$ and $\ldots$ and $(e_1 = e_1')$ where $e_1, e_1', \ldots, e_1, e_1'$ are expressions of atomic type. In the case of $B_1(x_1, \ldots, x_n)$, which is called a source predicate, these expressions can only be source expressions, while in the case of $B_2(y_1, \ldots, y_m)$, which is called a target predicate, these expressions can only be target expressions.

The earlier formulas $m_1$ and $m_2$ are examples of nested tgds over the schema $S_1$ and schema $S_2$. Second-order nested tgds (or, SO nested tgds, in short) are defined as an extension of nested tgds in the following way.

Each source expression that can appear in $B_1$ and each source expression $e_i^s$ that can appear in the with clause can now be a function term t, defined by the grammar t::=e|F(t) where e is an expression as before (over the source variables $x_1, \ldots, x_n$) while F is a function name (out of a possibly infinite set of function names that are available). It is possible that one function name is shared among multiple nested SO tgds.

The function F is sometimes called a Skolem function and a corresponding function term F(t) is sometimes called a Skolem term. One reason for this terminology is that the subsequent Algorithm 1, described infra, includes a step (step 31) that generates such function terms (Skolem terms) based on a procedure called Skolemization.

Figure 5:
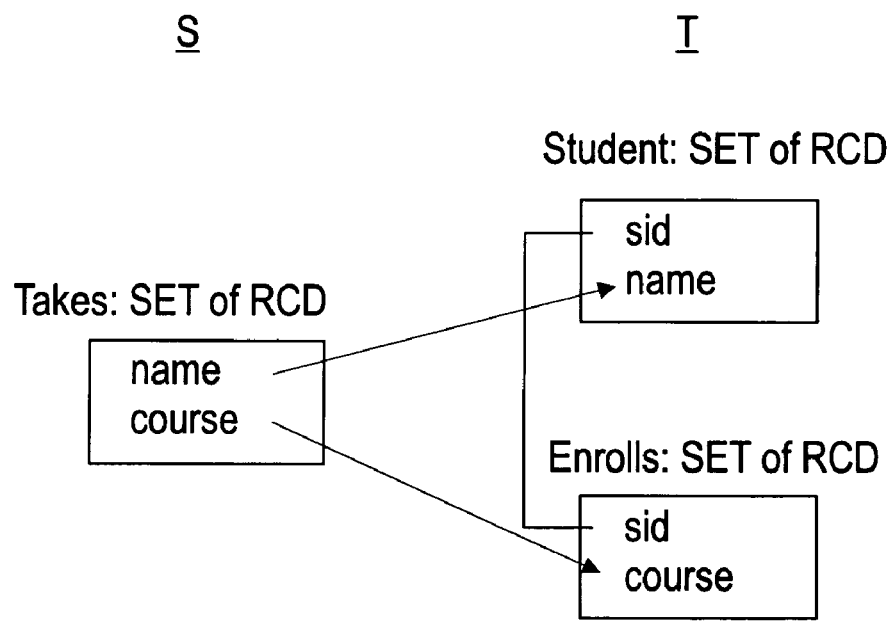
FIG. 5 depicts schemas illustrating a Skolem function, in accordance with embodiments of the present invention.

As an example, FIG. 5 depicts schemas S and T to illustrate a Skolem function, in accordance with embodiments of the present invention. The following set $M_{ST}$ is a schema mapping comprising SO nested tgds over the schemas S and T that both use the Skolem function F:

$M_{ST}$ = { <u>for</u> (t <u>in</u> Takes)
    <u>exists</u> (s <u>in</u> Student)
    <u>with</u> s.sid = F(t.name) <u>and</u> s.name = t.name
    <u>for</u> (t <u>in</u> Takes)
    <u>exists</u> (e <u>in</u> Enrolls)
    <u>with</u> e.sid = F(t.name) <u>and</u> e.course = t.course
}

The source schema S includes a Takes table storing student names and courses the students take. The schema T includes two separate tables: a Student table, storing student ids and student names, and an Enrolls table relating student ids and courses. The mapping $M_{ST}$ splits a tuple (name, course) into two tuples of Student and Enrolls, one containing the name the other one containing the course. At the same time, a Skolem function F is used to assign an "unknown" student id for each student name. The Skolem function F is used consistently (i.e., having the name as parameter) in both formulas to express the fact that a given student name is assigned the same student id in both tables.

2.4 Two Semantics of Mapping Composition

There are two semantics that can be associated with schema mappings and with their composition. The first semantics, the relationship semantics, is more general, while the second semantics, the transformation semantics is more suitable for certain specialized tasks, such as schema evolution, optimization of data transformation flows, and also generates simpler formulas.

2.4.1 Relationship Semantics

Schema mappings can be viewed as describing relationships between instances over two schemas. Under this view, the formulas that appear in a schema mapping are considered as inter-schema constraints. More concretely, given a schema mapping $M_{12}$ between a schema $S_1$ and a schema $S_2$, one can define the set $Rel(M_{12}) = \{(I_1,I_2) | I_1$ is an instance over $S_1$, $I_2$ is an instance over $S_2$, and $(I_1, I_2)$ satisfies $M_{12}\}$    (1)

This set Rel ($M_{12}$), called the binary relation of $M_{12}$ or the relationship induced by $M_{12}$, contains all the "valid" pairs of instances ($I_1$, $I_2$), where "valid" means pairs of instances ($I_1$, $I_2$) that satisfy all the constraints that appear in $M_{12}$. Given two schema mappings $M_{12}$, from schema $S_1$ to schema $S_2$, and $M_{23}$ from schema $S_2$ to another schema $S_3$, the composition Rel ($M_{12}$)·Rel ($M_{23}$) of their induced relationships is defined as the composition of the two binary relations Rel ($M_{12}$) and Rel ($M_{23}$):

$$Rel(M_{12}) \cdot Rel(M_{23}) = \{(I_1, I_3) | I_1 \text{ is an instance over } S_1, \\ I_3 \text{ is an instance over } S_3, \text{ and there is an instance} \\ I_2 \text{ over } S_2 \text{ such that } (I_1, I_2) \text{ satisfies } M_{12} \text{ and } (I_2, \\ I_3) \text{ satisfies } M_{23}\} \quad (2)$$

Then, by definition, a schema mapping $M_{13}$ defines the composition of schema mappings $M_{12}$ and $M_{23}$, under the relationship semantics, if the following equation is satisfied:

$$Rel(M_{13}) = Rel(M_{12}) \cdot Rel(M_{23}) \quad (3)$$

The above definition is for schemas that are non-nested and for schema mappings that are between non-nested schemas. (A non-nested schema is a schema as defined earlier, with the restriction that there are no set-type elements that are nested within other set-type elements. Schemas of relational databases are good examples of non-nested schemas.)

In general, for schemas that are nested (that is, can have set-type elements that are nested within other set-type elements) the above definition is slightly modified by requiring that all instances (e.g., $I_1$, $I_2$, $I_3$) that appear in equations (1) and (2) to be in a normal form that is called partitioned normal form (or PNF).

An instance is said to be in the partitioned normal form (PNF) if there cannot be two records in the same set (where the set can occur in any place in the instance) such that the two records have the same atomic sub-components, component-wise, but different set-valued sub-components.

For example, the instance I on the left in FIG. 3 is not in PNF, because there are three records that have the same atomic components (001 and Mary for the "sid" and "name" components, respectively) but different sets of courses. In contrast, the instance I' on the right in FIG. 3 is in PNF (intuitively, all the courses for 001 and Mary have been merged under a single set.)

PNF is a goodness criterion for instances; this criterion requires a natural form of data merging (grouping) to be satisfied by instances. As an important special case, all non-nested instances are automatically in PNF.

2.4.2 Transformation Semantics

A schema mapping can be viewed as describing a process (data movement) in which a target instance is materialized, given a source instance I and the schema mapping. More concretely, a schema mapping $M_{12}$ from schema $S_1$ to schema $S_2$ defines a function that, given an instance $I_1$ over $S_1$, computes an instance $I_2$ over $S_2$:

$$I_2 = M_{12}(I_1) \quad (4)$$

The formal definition of the function is as follows. First, all the formulas that appear in $M_{12}$ are Skolemized, by applying the procedure described in detail infra for step 41 of Algorithm 2 (see FIG. 12 described infra). Let the set of resulting Skolemized formulas from step 31 of Algorithm 1 be $M'_{12}$. For the earlier example $M_{12} = \{m_1, m_2\}$, the Skolemized set $M'_{12}$ includes the formulas $m_1'$ and $m_2'$ shown in the description of step 41 of Algorithm 2.

In the second step, the chase with SO nested tgds is used to construct a target instance $I_2'$ based on $I_1$, using the mapping $M'_{12}$. At the beginning of the chase, the target instance $I_2'$ is empty. Then, for each SO nested tgd m' in $M'_{12}$, and for each binding of the for clause of m' to tuples in the source instance $I_1$ such that the first where clause is satisfied, the chase adds tuples to the target instance $I_2'$ such that the exists clause of m', its associated where clause and the with clause are satisfied.

Figure 6:
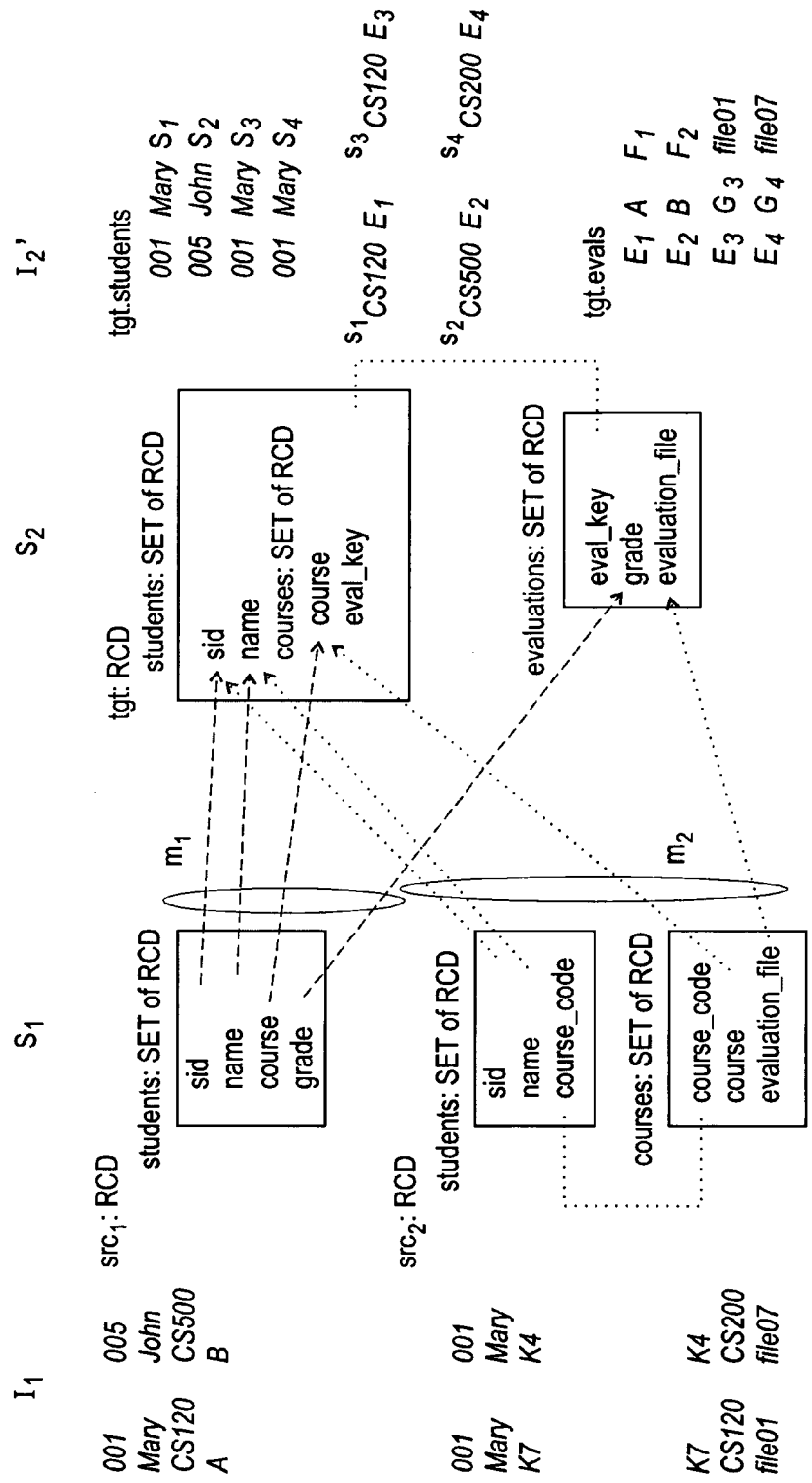
FIG. 6 depicts a mapping that illustrates the chase process for constructing a target instance, in accordance with embodiments of the present invention.

As an example, FIG. 6 depicts a mapping that illustrates the chase process for constructing a target instance, in accordance with embodiments of the present invention. In particular, FIG. 6 depicts a source instance $I_1$ over the schema $S_1$ illustrated earlier. The source instance $I_1$ contains two "student" tuples under the root "$src_1$": [001, Mary, CS120, A] for Mary and [005, John, CS500, B] for John. For simplicity, FIG. 6 does not show the labels that are associated with the preceding values; i.e., the labels "sid", "name", "course", and "grade". These labels are shown instead in the schema $S_1$, which is illustrated right near the instance. Furthermore, the instance $I_1$ contains two more tuples about Mary in the "students" set under the root "$src_2$" (i.e., the tuples [001, Mary, K7] and [001, Mary, K4]), and two more tuples implicitly about Mary in the "courses" set under the root "$src_2$" (i.e., the tuples [K7, CS120, file01] and [K4, CS200, file07]).

For this example, the chase works as follows. The for clause of $m_1'$ can be instantiated to the first tuple [001, Mary, CS120, A] in the "students" set of "$src_1$". Then, to satisfy the exists clause, its associated where clause as well as the with clause of $m_1'$, three tuples are added. First, a tuple [001, Mary, $s_1$] is added to the "students" set of the root "tgt". The value 001 is the "sid" component of this new tuple, Mary is the "name" component, and $s_1$ denotes the set value (initially empty) for the "courses" component. Then, a second tuple [CS120, $E_1$(001, Mary, CS120, A)] is added to the set $s_1$ of the previous tuple. Here, $E_1$(001, Mary, CS120, A) is a ground Skolem term obtained by applying the Skolem function $E_1$ to the concrete values (001, Mary, CS120, A). This Skolem function and its arguments are specified by the formula $m_1'$ which is the result of the Skolemization step mentioned earlier. Finally, a third tuple [$E_1$(001, Mary, CS120, A), A, F(001, Mary, CS120, A)] is added to the "evaluations" set under the root "tgt". Here, $E_1$(001, Mary, CS120, A) is the same ground Skolem term created before, while F(001, Mary, CS120, A) is a new ground Skolem term obtained by applying the Skolem function F to the concrete values (001, Mary, CS120, A). Again, this Skolem function and its arguments are specified by the formula $m_1'$ which is the result of the Skolemization step mentioned earlier.

The above described process is repeated for all the tuples in the source instance $I_1$ and for all the formulas in M12' (e.g., for $m_2'$ in addition to $m_1'$). At the end, each distinct ground function term is replaced by a unique value all throughout $I_2$. For example, the two occurrences of $E_1$(001, Mary, CS120, A) are replaced by a value $E_1$ that is generated so that it is different from every other value. A different ground function term, such as F(001, Mary, CS120, A), is replaced by a different value (e.g., $F_1$). The instance $I_2'$ depicted in FIG. 6 at the right of schema $S_2$ is the result of applying the chase with the SO nested tgds in $M'_{12}$.

After the chase finishes, the resulting target instance $I_2'$ is further transformed (PNF-ized) into an instance $I_2$ that is in the partitioned normal form (PNF) described earlier. The PNF-ization identifies all records that appear in the same set (where the set can occur in any place in the instance) such that the records have the same atomic sub-components, component-wise, but different set-valued sub-components. For all such records, the set-valued components are unioned together. The process continues recursively until no such records can be found.

For the previous example, the instance $I_2'$ in FIG. 6 is not in PNF. It contains three tuples that have the same atomic components (001, Mary) but different sets: $s_1$, $s_3$ and $s_4$. To PNF-ize the instance, the three tuples are merged into one tuple, whose set is the union of $s_1$, $s_3$ and $s_4$. FIG. 7 illustrates PNF-izing the instance $I_2'$ into the final instance $I_2$, in accordance with embodiments of the present invention. The instance $I_2$ is $M_{12}(I_1)$.

Then, by definition, a schema mapping $M_{13}$ defines the composition of schema mappings $M_{12}$ and $M_{23}$, with respect to the transformation semantics, if the following equation is satisfied:

$$M_{13}(I_1)=M_{23}(M_{12}(I_1)), \text{ for every instance } I_1 \text{ over } S_1 \qquad (5)$$

With respect to schema evolution (see Section 1.1), it is noted that for target schema evolution the mapping $M_{12}$ is provided or specified before the mapping $M_{23}$ is provided or specified, whereas for source schema evolution the mapping $M_{12}$ is provided or specified after the mapping $M_{23}$ is provided or specified.

3. Algorithm 1: Composition with Respect to Relationship Semantics

The input to Algorithm 1 is as follows. Schema mappings $M_{12}$ and $M_{23}$ are inputs expressed as constraints in the language of second-order nested tuple-generating dependencies (or SO nested tgds). The schema mapping $M_{12}$ is a set of SO nested tgds that relate a schema $S_1$ and a schema $S_2$. Similarly, schema mapping $M_{23}$ is a set of SO nested tgds that relate a schema $S_2$ to a schema $S_3$.

Figure 8:
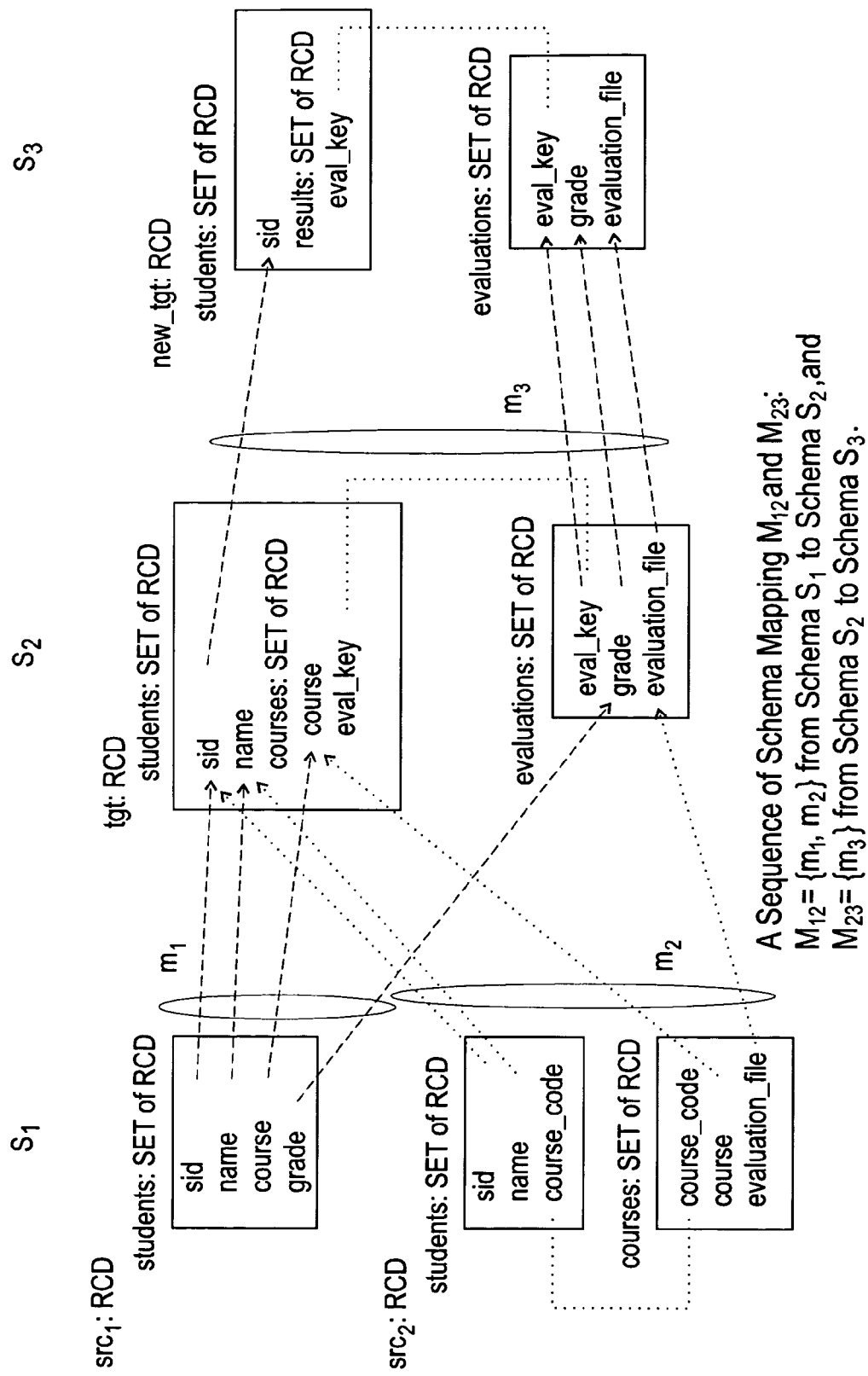
FIG. 8 illustrates a sequence of schema mappings, in accordance with embodiments of the present invention.

FIG. 8 illustrates a sequence of schema mappings $M_{12}$ and $M_{23}$ to illustrate an example of input to the Algorithm 1, in accordance with embodiments of the present invention. $M_{12}$ is a mapping from $S_1$ to $S_2$, and $M_{23}$ is a mapping from $S_2$ to $S_3$, where $S_1$, $S_2$, and $S_3$ are the three schemas illustrated earlier. $M_{12}$ is the set $\{m_1, m_2\}$ of formulas described earlier, and $M_{23}$ comprises the following formula $m_3$:

$m_3$: for (s in tgt.students) (c in s.courses) (e in tgt.evaluations)
    where c.eval_key=e.eval_key
    exists (s' in new_tgt.students) (r' in s'.results) (e' in new_tgt.evaluations)
        where r'.eval_key=e'.eval_key
    with s.sid=s'.sid and e.eval_key=e'.eval_key
        e.grade=e'.grade and e.evaluation_file=e'.evaluation_file The output to Algorithm 1 is as follows. Schema mapping $M_{13}$, comprising nested tgds that relate schema $S_1$ and schema $S_3$, is an output representing the composition of $M_{12}$ and $M_{23}$ under the relationship semantics.

Figure 9A:
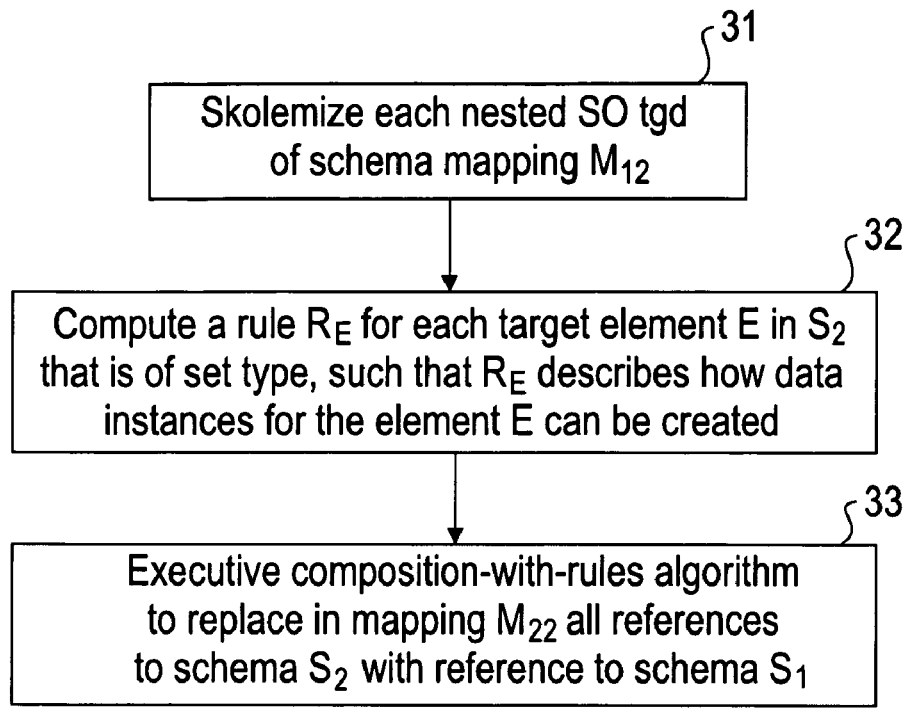
FIGS. 9A-9C are flow charts depicting an algorithm for determining a composition of schema mappings with respect to relationship semantics, in accordance with embodiments of the present invention.
Figure 9B:
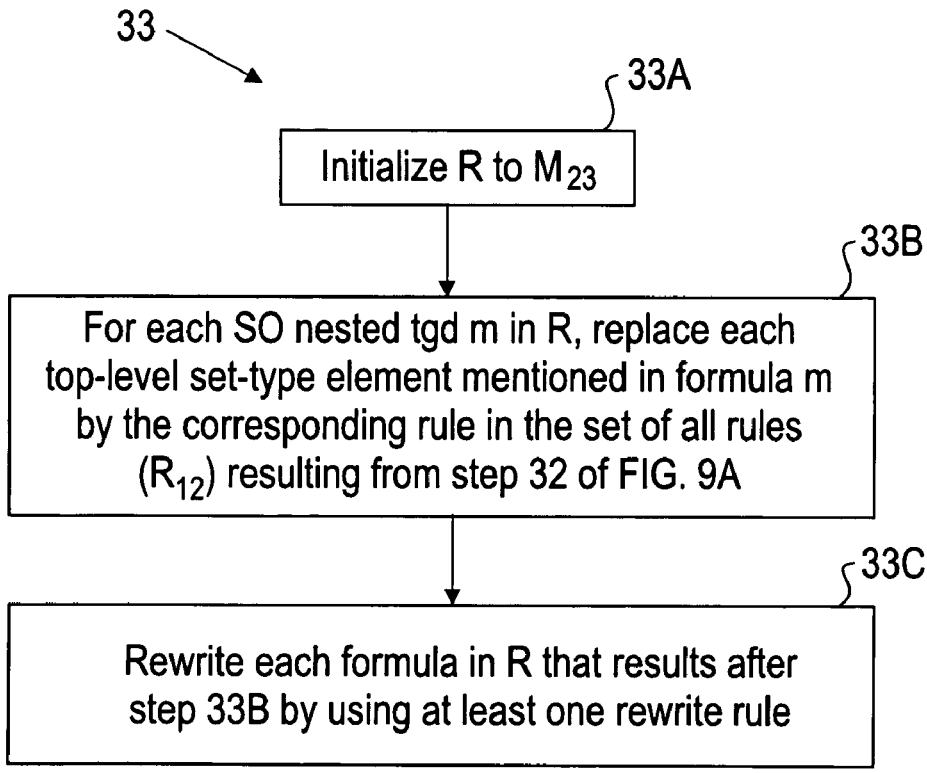
Figure 9C:
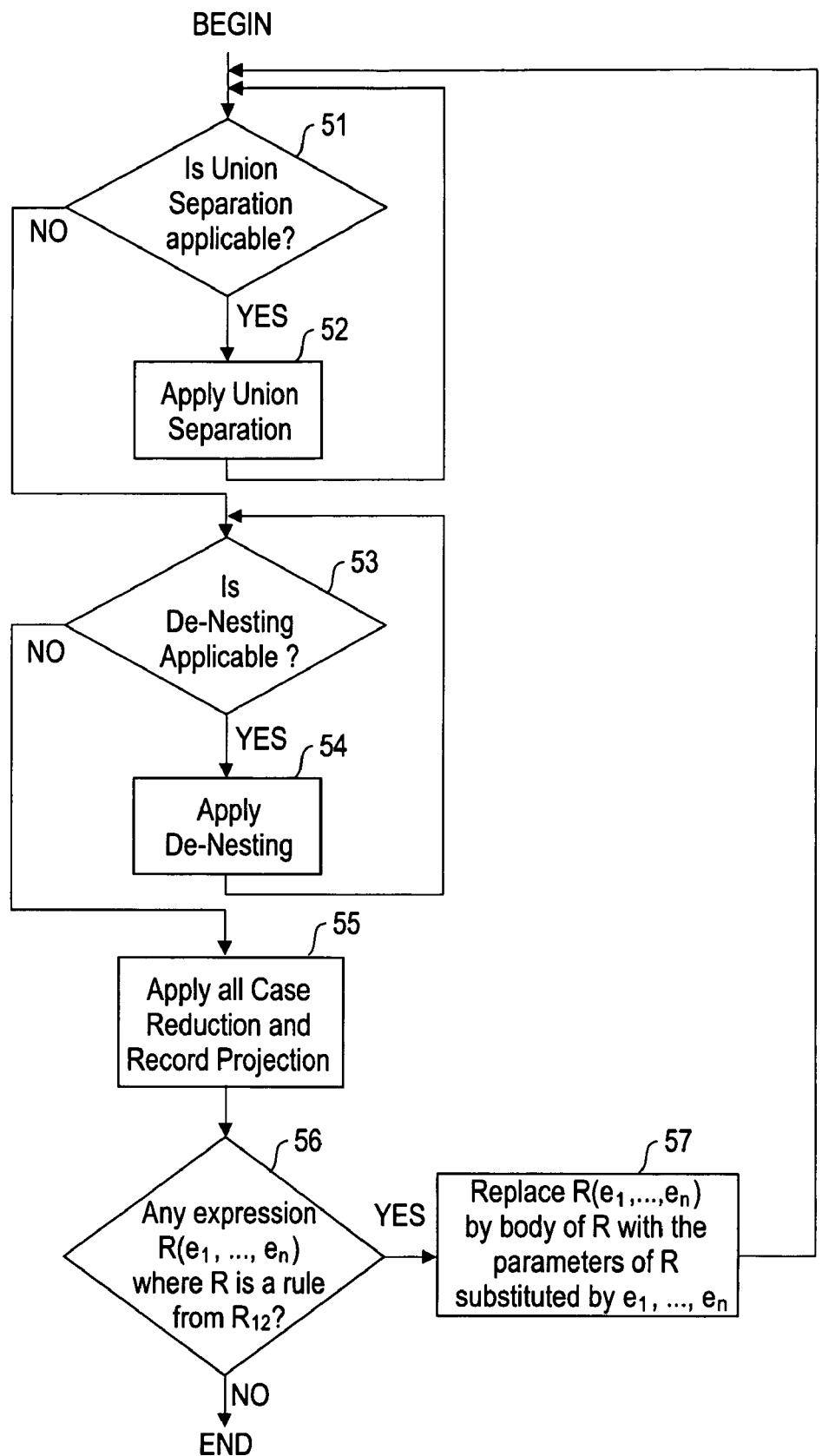

FIGS. 9A-9C (collectively, "FIG. 9") are flow charts depicting steps 31-34 of Algorithm 1 for determining a composition of schema mappings with respect to relationship semantics, in accordance with embodiments of the present invention. In the discussion of FIG. 9, the term "target element" refers to an element of schema $S_2$.

In step 31, each SO nested tgd m of $M_{12}$ is Skolemized by assigning a Skolem function term to each target atomic element whose value is not determined by formula m. A target atomic element X is said to be not determined by formula m if X is an atomic component of a tuple of $S_2$ that is asserted in the exists clause of formula m but X does not appear in any equality with a source atomic element in the with clause of formula m.

For example, for the formula $m_1$ of the earlier schema mapping $M_{12}$, the target atomic element e'.evaluation_file, which is a component of the tuple e' asserted in the exists clause of $m_1$, is not determined by $m_1$, since e'.evaluation_file does not appear in any equality in the with clause of $m_1$. As additional examples, for the same formula $m_1$, the target atomic elements c'.eval_key and e'.eval_key are components of the tuples c' and e' in the exists clause of $m_1$, but are not determined by $m_1$ (i.e., there is an equality that relates c'.eval_key and e'.eval_key in the where clause of $m_1$, but not in the with clause of $m_1$).

For each formula m, Skolemization adds an equality in the with clause of m for each target atomic element that is not determined by m. This additional equality equates the target atomic element with a Skolem term that is constructed by creating a new function symbol and applying it to a list of arguments consisting of all the source atomic elements that appear in the with clause of m. The resulting formula is another SO nested tgd m'. If two target atomic elements are constrained to be equal by the where clause of m, then the same Skolem term (i.e., the same function symbol) will be used in m'.

As an example of Skolemization, the formulas $m_1$ and $m_2$ of the earlier schema mapping $M_{12}$ are respectively transformed into the following formulas $m_1'$ and $m_2'$ (which are also SO nested tgds). The added equalities in the with clauses $m_1'$ and $m_2'$ are shown in italics.

$m_1'$: for (s in $src_1$.students)
    exists (s' in tgt.students) (c' in s'.courses) (e' in tgt.evaluations)
        where c'.eval_key=e'.eval_key
    with s.sid=s'.sid and s.name=s'.name and
        s.course=c'.course and s.grade=e'.grade and
        $E_1$(s.sid, s.name, s.course, s.grade)=c'.eval_key and
        $E_1$(s.sid, s.name, s.course, s.grade)=e'.eval_key and
        F(s.sid, s.name, s.course, s.grade)=e'.evaluation_file $m_2'$: for (s in $src_2$.students) (c in $src_2$.courses)
    where s.course_code=c.course_code
    exists (s' in tgt.students) (c' in s'.courses) (e' in tgt.evaluations)
        where c'.eval_key=e'.eval_key
    with s.sid=s'.sid and s.name=s'.name and
        c.course=c'.course and c.evaluation_file=e'.evaluation_file and
        $E_2$(s.sid, s.name, c.course, c.evaluation_file)=c'.eval_key and
        $E_2$(s.sid, s.name, c.course, c.evaluation_file)=e'.eval_key and
        G(s.sid, s.name, c.course, c.evaluation_file)=e'.grade Note that for both $m_1'$ and $m_2'$, since the eval_key component of c' is constrained to be equal to the eval_key of e' (in the original formulas), the same Skolem term is being used for the two components ($E_1$(s.sid, s.name, s.course, s.grade) in $m_1'$, and $E_2$(s.sid, s.name, c.course, c.evaluation_file) in $m_2'$). On the other hand, the evaluation_file component of e' and the grade component of e' are not equal to anything in the where clause of $m_1'$ and $m_2'$, respectively; therefore evaluation_file and grade are used in unique Skolem terms F(s.sid, s.name, s.course, s.grade) and G(s.sid, s.name, c.course, c.evaluation_file), respectively.

In step 32 for each target element E in schema $S_2$ that is of set type, a rule $R_E$ is computed such that $R_E$ describes how data instances for the element E can be created based on the Skolemized SO nested tgds relevant for E obtained in step 31. Each such rule $R_E$ includes a union of a plurality of query terms that creates data instances for the element E based on all the skolemized SO nested tgds that are relevant for E (i.e., each Skolemized SO nested tgd recites E in its exists clause).

For example, the element "students" in the earlier schema $S_2$ is of a set type. Moreover, among the two Skolemized SO nested tgds, $m_1'$ and $m_2'$, that are generated in step 31, both $m_1'$ and $m_2'$ are relevant for "students" since "students" is recited in the exists clause of both $m_1'$ and $m_2'$. Hence a rule that includes a union of two query terms is generated for "students":

$R_{students}$=for (s in $src_1$.students)
 return [sid=s.sid, name=s.name, courses=$R_{courses}$(s.sid, s.name)]
∪
for (s in $src_2$.students) (c in $src_2$.courses)
where s.course_code=c.course_code
return [sid=s.sid, name=s.name, courses=$R_{courses}$(s.sid, s.name)]

Each query term joined by the union operator ∪ in $R_{students}$ includes a for clause that is the same as the for clause in the corresponding SO nested tgd. Furthermore, if the SO nested tgd includes a where clause following immediately the for clause, then this where clause is also included in the query term. In addition, each query term has a return clause that specifies how to construct the atomic components of a student record, based on the with clause of the corresponding SO nested tgd. For example, in the first query term, the sid component is to be constructed by taking the value of s.sid, where s represent a student record in the source. The correct expressions (e.g., s.sid) are decided based on the with clause of the corresponding Skolemized SO nested tgd, which specifies what the values of the target atomic components should be.

In addition, in the return clause, each component that is of set type is constructed by invoking a rule that is similar to the above rule $R_{students}$ but is parameterized by the values of the atomic components of the record. For example, the "courses" component is constructed by invoking a rule $R_{courses}$ with parameters s.sid and s.name. Such invocation constructs one set of course records for each different combination of student id and student name.

The rule for "courses", given the above two Skolemized SO nested tgds, is shown below. Again, as before, both $m_1'$ and $m_2'$ are relevant (their exists clauses both contain "courses"). Therefore, two query terms appear in the union. Furthermore, each query term has a filtering condition in its where clause so that it generates course records only for students whose sid and name values match the values of the parameters ($1_1$ and $1_2$).

$R_{courses}$ ($1_1$, $1_2$)=
 for (s in $src_1$.students)
 where s.sid=$1_1$ and s.name=$1_2$
 return [course=s.course, eval_key=$E_1$(s.sid, s.name, s.course, s.grade)]
∪
for (s in $src_2$.students) (c in $src_2$.courses)
where s.course_code=c.course_code and s.sid=$1_1$ and s.name=$1_2$
return [course=c.course, eval_key=$E_2$(s.sid, s.name, c.course, c.evaluation_file)]

In general, such a parameterized rule is constructed for every element of set type that is nested inside another set type. Rules for top-level set-type elements do not need to be parameterized. As another example of such top-level rule, the rule for "evaluations" is listed below.

$R_{evaluations}$=for (s in $src_1$.students)
 return [eval_key=$E_1$(s.sid, s.name, s.course, s.grade),
 grade=s.grade,
 evaluation_file=F(s.sid, s.name, s.course, s.grade)]
∪
for (s in $src_2$.students) (c in $src_2$.courses)
where s.course_code=c.course_code
return [eval_key=$E_2$(s.sid, s.name, c.course, c.evaluation_file),
 grade=G(s.sid, s.name, c.course, c.evaluation_file),
 evaluation_file=c.evaluation_file]

In step 33, a composition-with-rules algorithm is executed to replace in mapping $M_{23}$ all references to schema $S_2$ with references to schema $S_1$. Let a rule set $R_{12}$ be the set of all the rules that result after applying step 32. The composition-with-rules algorithm includes the following steps 33A, 33B, and 33C.

In step 33A, a mapping holder R is initialized to be $M_{23}$. For the example under discussion, R includes only one formula, $m_3$, shown earlier. Generally, R includes all formulas m comprised by mapping $M_{23}$. The formulas in the mapping holder R resulting from step 33A will be transformed by steps 33B and 33C to a form that has eliminated all references to $S_2$ to become the output mapping $M_{13}$ of Algorithm 1.

In step 33B, for each SO nested tgd m in R, each top-level set-type element that is mentioned in formula m is replaced by the corresponding rule (for that element) in the rule set $R_{12}$. For the example under discussion, the formula $m_3$ is transformed into the following formula:

$m'_3$: for (s in <body of $R_{students}$>) (c in s.courses) (e in <body of $R_{evaluations}$>)
 where c.eval_key=e.eval_key
 exists (s' in new_tgt.students) (r' in s'.results) (e' in new_tgt.evaluations)
 where r'.eval_key=e'.eval_key
 with s.sid=s'.sid and e.eval_key=e'.eval_key
 e.grade=e'.grade and e.evaluation_file=e'.evaluation_file where the notation <body of $R_{students}$> represents a shorthand for the union of query terms that is on the right-hand side of the equal symbol in the above definition of $R_{students}$. The notation <body of $R_{evaluations}$> is a similar short-hand for the case of $R_{evaluations}$.

In step 33C, each formula in R that results after step 33B is rewritten by using at least one rewrite rule of four rewrite rules. These rewrite rules, called de-nesting, union separation, record projection and case reduction, are illustrated in FIGS. 10 and 11, in accordance with embodiments of the present invention. FIG. 10 illustrates de-nesting, and FIG. 11 illustrates union separation, record projection, and case reduction.

For a given formula m in R, the de-nesting rule removes inner nested expressions such as the inner nested expression {for ($y_1$ in $Y_1$) . . . ($y_k$ in $Y_k$) where B return r} in FIG. 10 via replacement of each inner nested expression by the notation e[g→r] in a relevant clause(s) of formula m to simulate the functionality of each replaced inner nested expression and via insertion of the generators ($y_1$ in $Y_1$) . . . ($y_k$ in $Y_k$) in the outer for clause. The de-nesting rule assumes that all the variables in the inner for_where_return_expression are different from (i.e., do not conflict with) the outer variables. This will be accomplished by renaming all the inner variables before applying every de-nesting step.

The union separation rule separates the N expressions (N at least 2) joined by the union operator (∪) in a given formula m in R into N formulas. In FIG. 11, for example, the formula comprising the two expressions $X_1$ and $X_2$ joined as $X_1 \cup X_2$ is separated into the two formulas shown, namely a first formula comprising $X_1$ and a second formula comprising $X_2$.

The record projection rule projects expression $e_i$ in a formula m by replacing each appearance of [ . . . , $L_i=e_i$, . . . ].$L_i$ with $e_i$, as shown in FIG. 11.

The case reduction rule has two cases. First, whenever a formula m includes an appearance of <$L_i=e_i$>.$L_i$ this appearance of $<L_i=e_i>$. $L_i$ is replaced by ei. However, if the formula m includes an appearance of $<L_i=e_i>$. $L_j$, where $L_i$ and $L_j$ are different, then the formula is abandoned. The reason for this abandoning of the formula is that the formula can never be satisfied, since the choice expression $<L_i=e_i>$ includes a component (element) called $L_i$ but the larger expression tries to obtain a component called $L_j$. Since the formula cannot be satisfied, there is no need to include the formula in the final result of composition. Here, the notation $\perp$ is used to denote formally an abandoned formula (or, formula that cannot be satisfied).

The rewriting process is as follows. While there is some formula m' in R for which some rewrite rule applies to it (or to some subexpression of it), the method of the present invention applies the rewrite rule to m', adds the resulting formulas (if not equal to $\perp$) to R and removes m' from R.

For example, for the above m'$_3$, since $<$body of R$_{students}>$ is the union of two query terms (which we can be denoted here, in short, $T_1$ and $T_2$), it follows that the union separation rule is applicable and results in the following two formulas:

for (s in $T_1$) (c in s.courses) (e in $<$body of R$_{evaluations}>$)
    where c.eval_key=e.eval_key
    exists (s' in new_tgt.students) (r' in s'.results) (e' in new_tgt.evaluations)
        where r'.eval_key=e'.eval_key
    with s.sid=s'.sid and e.eval_key=e'.eval_key
        e.grade=e'.grade and e.evaluation_file=e'.evaluation_file for (s in $T_2$) (c in s.courses) (e in $<$body of R$_{evaluations}>$)
    where c.eval_key=e.eval_key
    exists (s' in new_tgt.students) (r' in s'.results) (e' in new_tgt.evaluations)
        where r'.eval_key=e'.eval_key
    with s.sid=s'.sid and e.eval_key=e'.eval_key
        e.grade=e'.grade and e.evaluation_file=e'.evaluation_file The mapping m'$_3$ is removed and the above two formulas are added to R. The rewriting process continues by trying to rewrite the first of the two formulas. Since $T_1$ is the expression $T_1$=for ($s_1$ in src$_1$.students)
    return [sid=$s_1$.sid, name=$s_1$.name, courses=R$_{courses}$ ($s_1$.sid, $s_1$.name)]

(where the variable s has been renamed to $s_1$), it follows that the de-nesting rule can be applied and the result is:

for ($s_1$ in src$_1$.students)
    (c in [sid=$s_1$.sid, name=$s_1$.name, courses=R$_{courses}$ ($s_1$.sid, $s_1$.name)].courses)
    (e in $<$body of R$_{evaluations}>$)
    where c.eval_key=e.eval_key
    exists (s' in new_tgt.students) (r' in s'.results) (e' in new_tgt.evaluations)
        where r'.eval_key=e'.eval_key
    with [sid=$s_1$.sid, name=$s_1$.name, courses=R$_{courses}$ ($s_1$.sid, $s_1$.name)].sid=s'.sid
        and e.eval_key=e'.eval_key
        e.grade=e'.grade and e.evaluation_file=e'.evaluation_file Note that the original variable s has been replaced, in each of the two places where it occurred, by the record expression [sid=$s_1$.sid, name=$s_1$.name, courses=R$_{courses}$ ($s_1$.sid, $s_1$.name)] that is in the return clause of $T_1$. Now the record projection rule can be applied twice and the above formula is replaced by the following:

for ($s_1$ in src$_1$.students)
    (c in R$_{courses}$ ($s_1$.sid, $s_1$.name))
    (e in $<$body of R$_{evaluations}>$)
    where c.eval_key=e.eval_key
    exists (s' in new_tgt.students) (r' in s'.results) (e' in new_tgt.evaluations)
        where r'.eval_key=e'.eval_key
    with $s_1$.sid=s'.sid and e.eval_key=e'.eval_key
        e.grade=e'.grade and e.evaluation_file=e'.evaluation_file This formula is the same as:

for ($s_1$ in src$_1$.students)
    (c in $<$body of R$_{courses}$ where $l_1$ is replaced by $s_1$.sid and $l_2$ is replaced by $s_1$.name$>$)
    (e in $<$body of R$_{evaluations}>$)
    where c.eval_key=e.eval_key
    exists (s' in new_tgt.students) (r' in s'.results) (e' in new_tgt.evaluations)
        where r'.eval_key=e'.eval_key
    with $s_1$.sid=s'.sid and e.eval_key=e'.eval_key
        e.grade=e'.grade and e.evaluation_file=e'.evaluation_file This process continues then by applying the union separation rule for the body of R$_{courses}$, then de-nesting, and so on.

The algorithm terminates with a set $M_{13}$ of SO nested tgds that mention only schema $S_1$ and schema $S_3$. This set $M_{13}$ is the schema mapping that is the composition of $M_{12}$ and $M_{23}$, with respect to the relationship semantics. For the example, $M_{13}$ includes the below formulas (and more):

($m_{13}$) for ($s_1$ in src$_1$.students) ($s_2$ in src$_1$.students) ($s_3$ in src$_1$.students)
    where $E_1(s_2$.sid, $s_2$.name, $s_2$.course, $s_2$.grade)=$E_1(s_3$.sid, $s_3$.name, $s_3$.course, $s_3$.grade)
    and $s_1$.sid=$s_2$.sid and $s_1$.name=$s_2$.name
    exists (s' in new_tgt.students) (r' in s'.results) (e' in new_tgt.evaluations)
        where r'.eval_key=e'.eval_key
    with $s_1$.sid=s'.sid and $E_1(s_3$.sid, $s_3$.name, $s_3$.course, $s_3$.grade)=e'.eval_key
    and $s_3$.grade=e'.grade and
        $F(s_3$.sid, $s_3$.name, $s_3$.course, $s_3$.grade)=e'.evaluation_file (m'$_{13}$) for ($s_1$ in src$_1$.students) ($s_2$ in src$_1$.students) ($s_3$ in src$_2$.students) (c in src$_2$.courses)
    where $s_3$.course_code=c.course_code
    and $E_1(s_2$.sid, $s_2$.name, $s_2$.course, $s_2$.grade)=$E_2(s_3$.sid, $s_3$.name, $s_3$.course, $s_3$.grade)
    and $s_1$.sid=$s_2$.sid and $s_1$.name=$s_2$.name
    exists (s' in new_tgt.students) (r' in s'.results) (e' in new_tgt.evaluations)
        where r'.eval_key=e'.eval_key
    with $s_1$.sid=s'.sid and $E_1(s_3$.sid, $s_3$.name, $s_3$.course, $s_3$.grade)=e'.eval_key
    and $G(s_3$.sid, $s_3$.name, c.course, c.evaluation_file)=e'.grade and
    c.evaluation_file=e'.evaluation_file In consideration of the preceding discussion, step 33C is implemented for each formula in R that results after step 33B, by performing the process depicted in the flow chart of FIG. 9C for each formula. The flow chart of FIG. 9C comprises steps 51-57.

Step 51 determines whether union separation is applicable. If step 51 determines that union separation is not applicable, then step 53 is next executed. If step 51 determines that union separation is applicable then the union separation is executed in step 52, followed by iterative re-execution of the loop of steps 51-52 until union separation no longer applies in step 51 and the process next executes step 53.

Step 53 determines whether a de-nesting of a complex type expression is applicable. If step 53 determines that said de-nesting is not applicable, then step 55 is next executed. If step 53 determines that said de-nesting is applicable then said de-nesting is executed in step 54, followed by iterative re-execution of the loop of steps 53-53 until de-nesting no longer applies in step 53 and the process next executes step 55. Each de-nesting de-nests an outermost complex type expression in the formula being processed.

Step 55 performs all case reductions and record projections that are applicable.

Step 56 determines whether the formula being processed comprises an expression of the form $R(e_1, \ldots, e_n)$, wherein $R(e_1, \ldots, e_n)$ is a rule of the ruleset $R_{12}$ that results from step 32 of FIG. 9A. If step 56 determines that the formula being processed does not comprise such an expression of the form $R(e_1, \ldots, e_n)$ then the process ends. If step 56 determines that the formula being processed comprises such an expression of the form $R(e_1, \ldots, e_n)$ then step 57 replaces $R(e_1, \ldots, e_n)$ by the body of R such that the parameters of R (namely, $l_1, \ldots, l_n$) are respectively replaced by $e_1, \ldots, e_n$. Step 57 was illustrated supra in an example in which $R_{courses}$ was replaced by the body of $R_{courses}$, and the parameters $l_1$ and $l_2$ in the body of $R_{courses}$ were replaced by $s_1$.sid and $s_1$.name, respectively.

After step 57 is executed, the process re-executes the loop 51-57 iteratively until there no longer remains an expression of the form $R(e_1, \ldots, e_n)$ and the process ends.

The set of all such formulas, when taken in their entirety, describes the relationship between instances over $S_1$ and instances over $S_2$ that is implied by the relationships induced by the two given schema mappings (from $S_1$ to $S_2$ and from $S_2$ to $S_3$, respectively), characterized by not mentioning schema $S_2$ (i.e., the elements of tgt.students, tgt.students.courses, and tgt.evaluations of schema $S_2$ are not recited in formulas $m_{13}$ and $m'_{13}$ of mapping $M_{13}$).

As illustrated in the preceding examples, the particular rewrite rules invoked, and the order and number of times that said particular rewrite rules are invoked, depends on the structure of each formula m in R, such that application of the particular rewrite rules to m eliminates all references to schema $S_2$.

4. Algorithm 2: Composition with Respect to Transformation Semantics

The input to Algorithm 1 is as follows. Schema mappings $M_{12}$ and $M_{23}$ are inputs expressed as constraints in the language of second-order nested tuple-generating dependencies (or SO nested tgds). The schema mapping $M_{12}$ is a set of SO nested tgds that relate a schema $S_1$ and a schema $S_2$. Similarly, schema mapping $M_{23}$ is a set of SO nested tgds that relate a schema $S_2$ to a schema $S_3$.

The output to Algorithm 1 is as follows. Schema mapping $M_{13}$, consisting of a set of SO nested tgds that relate schema $S_1$ and schema $S_3$, is an output representing the composition of $M_{12}$ and $M_{23}$ under the transformation semantics.

Figure 12:
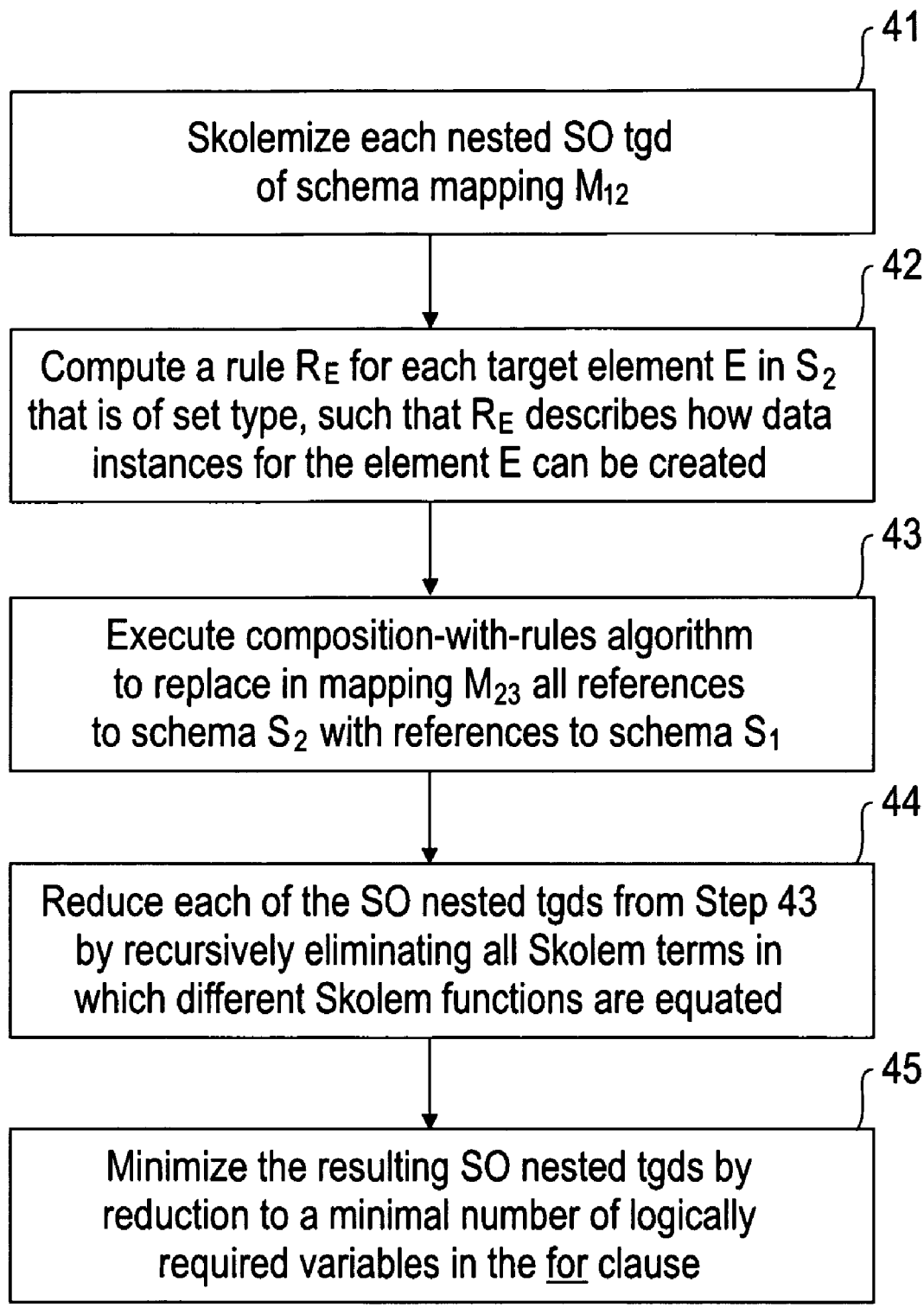
FIG. 12 is a flow chart depicting an algorithm for determining a composition of schema mappings with respect to transformation semantics, in accordance with embodiments of the present invention.

FIG. 12 is a flow chart depicting steps 41-45 of Algorithm 2 for determining a composition of schema mappings with respect to transformation semantics, in accordance with embodiments of the present invention. In the discussion of FIG. 12, the term "target element" refers to an element of schema $S_2$.

In FIG. 12, steps 41-43 for Algorithm 2 are the same as steps 31-33 (including steps 31A, 31B, 31C), respectively of FIG. 9 for Algorithm 1.

In step 44, each of the SO nested tgds in the mapping holder R that result after step 43, with no remaining reference to schema $S_2$, is reduced by the applying the following procedure. Each equality that appears in the first where clause of the SO nested tgd and involves Skolem terms is processed as follows. If the equality is of the form $F(t_1, \ldots, t_n) = F(t'_1, \ldots, t'_n)$ (i.e., equating Skolem terms with the same Skolem function) then the equality of said form is replaced by $t_1 = t'_1$ and ... and $t_n = t'_n$ to construct a new SO nested tgd that replaces the old SO nested tgd. If this new SO nested tgd still contains some equality involving Skolem terms in the first where clause, then step 44 is applied again (recursively) to the new SO nested tgd. If the equality is of the form $F(t_1, \ldots, t_n) = G(t'_1, \ldots, t'_n)$ (i.e., equating Skolem terms with different Skolem functions) or of the form $e = F(t_1, \ldots, t_n)$ then eliminate the current SO nested tgd from any further processing. In other words, step 44 is applied recursively to eliminate all Skolem term equalities in which different Skolem functions are equated or in which a Skolem term is equated to a non Skolem term.

For example, to apply step 44 to the SO nested tgd $m_{13}$ shown earlier, the equality $E_1(s_2.\text{sid}, s_2.\text{name}, s_2.\text{course}, s_2.\text{grade}) = E_1(s_3.\text{sid}, s_3.\text{name}, s_3.\text{course}, s_3.\text{grade})$ is replaced by $s_2.\text{sid} = s_3.\text{sid}$ and $s_2.\text{name} = s_3.\text{name}$ and $s_2.\text{course} = s_3.\text{course}$ and $s_2.\text{grade} = s_3.\text{grade}$. The resulting formula is:

for ($s_1$ in $src_1$.students) ($s_2$ in $src_1$.students) ($s_3$ in $src_1$.students)
  where $s_2.\text{sid} = s_3.\text{sid}$ and $s_2.\text{name} = s_3.\text{name}$ and
    $s_2.\text{course} = s_3.\text{course}$ and $s_2.\text{grade} = s_3.\text{grade}$
  and $s_1.\text{sid} = s_2.\text{sid}$ and $s_1.\text{name} = s_2.\text{name}$
  exists (s' in new_tgt.students) (r' in s'.results) (e' in new_tgt.evaluations)
    where r'.eval_key = e'.eval_key
    with $s_1.\text{sid} = s'.\text{sid}$ and $E_1(s_3.\text{sid}, s_3.\text{name}, s_3.\text{course}, s_3.\text{grade}) = e'.\text{eval\_key}$
    and $s_3.\text{grade} = e'.\text{grade}$ and
      $F(s_3.\text{sid}, s_3.\text{name}, s_3.\text{course}, s_3.\text{grade}) = e'.\text{evaluation\_file}$ Since none of the equalities in the first where clause contain a Skolem term, step 44 finishes here, for the above SO nested tgd (that is, there is no need for a recursive application of step 44).

As another example, the formula $m'_{13}$ shown earlier is eliminated in step 44, because $m'_{13}$ contains in its first where clause the equality $E_1(s_2.\text{sid}, s_2.\text{name}, s_2.\text{course}, s_2.\text{grade}) = E_2(s_3.\text{sid}, s_3.\text{name}, s_3.\text{course}, s_3.\text{grade})$, between two Skolem terms with different functions, $E_1$ and $E_2$.

Step 45 minimizes the resulting SO nested tgds in the mapping holder R. For each SO nested tgd that results after step 44, step 45 finds an equivalent SO nested tgd that has a minimal number of logically required variables in the for clause of each SO nested tgd. For example, the above formula can be shown to be equivalent to the following formula that uses just one variable in the for clause:

for ($s_3$ in $src_1$.students)
  exists (s' in new_tgt.students) (r' in s'.results) (e' in new_tgt.evaluations)
    where r'.eval_key = e'.eval_key
    with $s_3.\text{sid} = s'.\text{sid}$ and $E_1(s_3.\text{sid}, s_3.\text{name}, s_3.\text{course}, s_3.\text{grade}) = e'.\text{eval\_key}$
    and $s_3.\text{grade} = e'.\text{grade}$ and
      $F(s_3.\text{sid}, s_3.\text{name}, s_3.\text{course}, s_3.\text{grade}) = e'.\text{evaluation\_file}$ Intuitively, the reason why the earlier formula is equivalent to the above formula is that all that is needed from variables $s_1$ and $s_2$ in the with clause is $s_1.\text{sid}$. But this can be replaced with $s_3.\text{sid}$, since these two expressions are equal. Furthermore, whenever the variable $s_3$ can be instantiated to a tuple, the variables $s_1$ and $s_2$ can also be instantiated to the same tuples such that their pattern of equalities is satisfied. Hence, the formula is the same whether or not we assert $s_1$ and $s_2$ in the for clause ($s_3$ is enough).

The formal procedure for minimization of SO nested tgds is similar to the minimization of conjunctive queries in database query optimization.

The output of the algorithm is the set of all minimized SO nested tgds that result after step 45. As an example, the above SO nested tgd is part of the final result of composing schema mappings $M_{12}$ and $M_{23}$, under the transformation semantics. Another formula that is also part of this final result is:

for (s in $src_2$.students) (c in $src_2$.courses)
  where s.course_code=c.course_code
  exists (s' in new_tgt.students) (r' in s'.results) (e' in new_tgt.evaluations)
    where r'.eval_key=e'.eval_key
  with s.sid=s'.sid and $E_2$(s.sid, s.name, c.course, c.evaluation_file)=e'.eval_key
    and G(s.sid, s.name, c.course, c.evaluation_file)=e'.grade and
    c.evaluation_file=e'.evaluation_file The set of all such formulas in $M_{13}$ capture all the different ways of transforming the data from schema $S_1$ to schema $S_3$ that are equivalent to all the different ways of first transforming data from schema $S_1$ to the intermediate schema $S_2$ (as dictated by $M_{12}$) followed by all the different ways of transforming the resulting data from the intermediate schema $S_2$ to schema $S_3$ (as dictated by $M_{23}$).

It is noted that, although Algorithm 2 is Algorithm 1 with added steps 44 and 45, the result of Algorithm 2 is a set of formulas that is simpler (has fewer and also simpler formulas) than the result of Algorithm 1. If the main intention of schema mappings is for data transformation (and not for describing relationships between schemas) Algorithm 1 is to be preferred to Algorithm 2. However, if the primary intention of schema mappings is representing relationships between schemas, then Algorithm 1 is to be preferred, since Algorithm 2 is not guaranteed to return a schema mapping with equivalent relationship semantics.

It is noted that Algorithms 1 and 2 are each applicable to a variety of schemas, including relational database schemas, XML schemas, hierarchical schemas, etc.

5. Computer System

Figure 13:
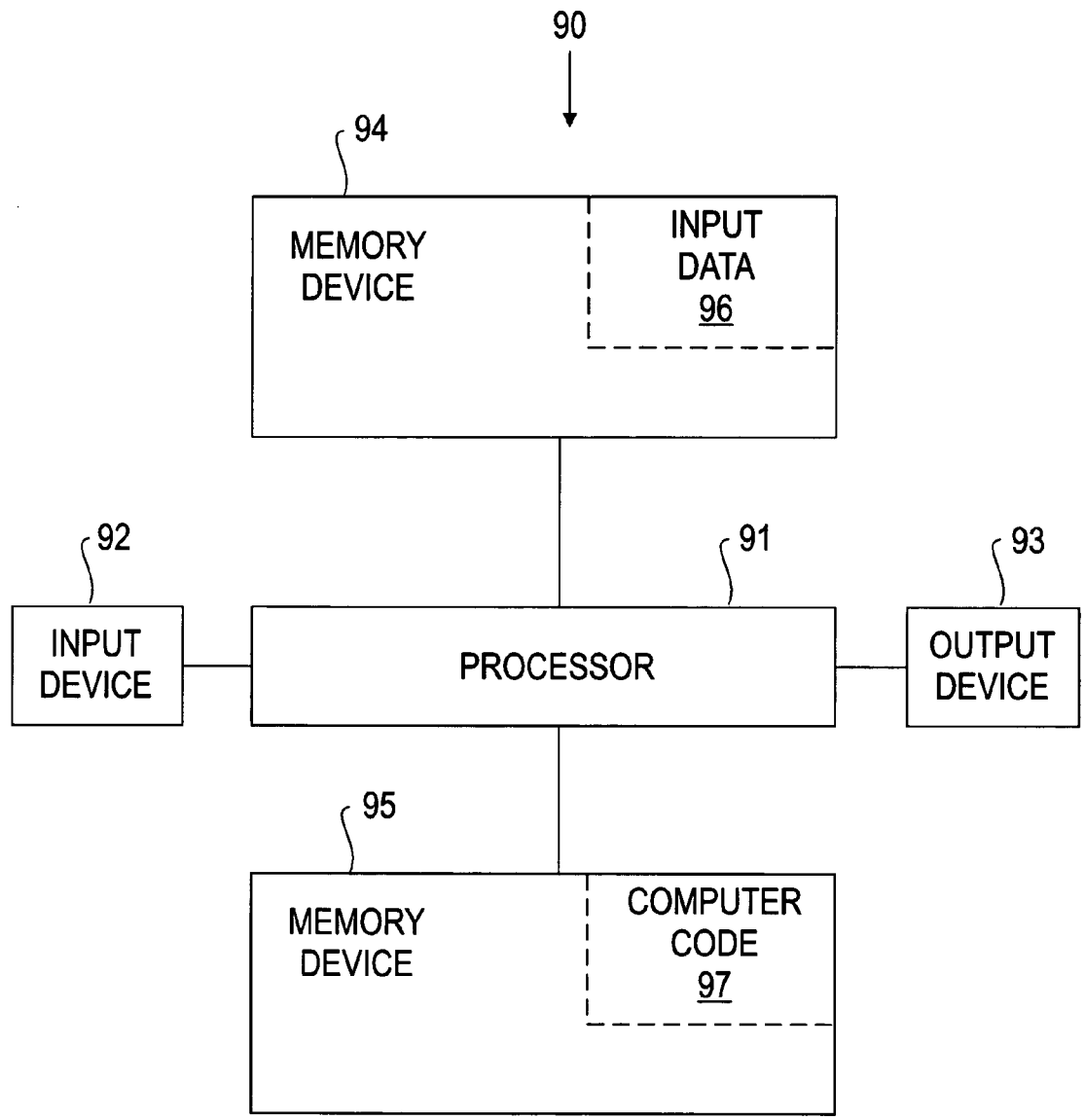
FIG. 13 illustrates a computer system for determining sequential composition of schema mappings, in accordance with embodiments of the present invention.

FIG. 13 illustrates a computer system 90 used for generating a schema mapping, in accordance with embodiments of the present invention. The computer system 90 comprises a processor 91, an input device 92 coupled to the processor 91, an output device 93 coupled to the processor 91, and memory devices 94 and 95 each coupled to the processor 91. The input device 92 may be, inter alia, a keyboard, a mouse, etc. The output device 93 may be, inter alia, a printer, a plotter, a computer screen, a magnetic tape, a removable hard disk, a floppy disk, etc. The memory devices 94 and 95 may be, inter alia, a hard disk, a floppy disk, a magnetic tape, an optical storage such as a compact disc (CD) or a digital video disc (DVD), a dynamic random access memory (DRAM), a read-only memory (ROM), etc. The memory device 95 includes a computer code 97. The computer code 97 includes an algorithm for generating a schema mapping. The processor 91 executes the computer code 97. The memory device 94 includes input data 96. The input data 96 includes input required by the computer code 97. The output device 93 displays output from the computer code 97. Either or both memory devices 94 and 95 (or one or more additional memory devices not shown in FIG. 13) may be used as a computer usable medium (or a computer readable medium or a program storage device) having a computer readable program code embodied therein and/or having other data stored therein, wherein the computer readable program code comprises the computer code 97. Generally, a computer program product (or, alternatively, an article of manufacture) of the computer system 90 may comprise said computer usable medium (or said program storage device).

Thus the present invention discloses a process for deploying or integrating computing infrastructure, comprising integrating computer-readable code into the computer system 90, wherein the code in combination with the computer system 90 is capable of performing a method for generating a schema mapping.

While FIG. 13 shows the computer system 90 as a particular configuration of hardware and software, any configuration of hardware and software, as would be known to a person of ordinary skill in the art, may be utilized for the purposes stated supra in conjunction with the particular computer system 90 of FIG. 13. For example, the memory devices 94 and 95 may be portions of a single memory device rather than separate memory devices.

While embodiments of the present invention have been described herein for purposes of illustration, many modifications and changes will become apparent to those skilled in the art. Accordingly, the appended claims are intended to encompass all such modifications and changes as fall within the true spirit and scope of this invention.

What is claimed is:

1. A method for generating a schema mapping, said method comprising:

providing a mapping $M_{12}$ from a schema $S_1$ to a schema $S_2$, said mapping $M_{12}$ relating the schema $S_2$ to the schema $S_1$, said schema $S_1$ and schema $S_2$ each comprising one or more elements, said mapping $M_{12}$ being expressed in terms of at least one second-order nested tuple-generating dependency (SO nested tgd);

providing a mapping $M_{23}$ from the schema $S_2$ to the schema $S_3$, said mapping $M_{23}$ relating the schema $S_3$ to the schema $S_2$, said schema $S_3$ comprising one or more elements, said mapping $M_{23}$ being expressed in terms of at least one SO nested tgd; and generating, by a processor of a computer system, a mapping $M_{13}$ from the schema $S_1$ to the schema $S_3$, said mapping $M_{13}$ relating the schema $S_3$ to the schema $S_1$, said mapping $M_{13}$ being expressed in terms of at least one SO nested tgd that does not expressly recite any element of the schema $S_2$, said generating the mapping $M_{13}$ comprising generating the mapping $M_{13}$ as a composition of the mappings $M_{12}$ and $M_{23}$, wherein at least one schema of the schemas $S_1$ and $S_2$ comprises at least one complex type expression nested inside another complex type expression, wherein said generating the mapping $M_{13}$ as a composition of the mappings $M_{12}$ and $M_{23}$ comprises:

Skolemizing each SO nested tgd of the mapping $M_{12}$;

computing a rule $R_E$ for each element E in the schema $S_2$ that is of set type, wherein the rule $R_E$ describes how data instances of the element E can be created based on the Skolemized SO target tgds that are relevant for the element E, and wherein $R_{12}$ is a rule set denoting the set of all of said rules $R_E$ and replacing all references to the schema $S_2$ in the mapping $M_{23}$ with references to the schema $S_1$ using the rule set $R_{12}$, wherein said replacing all references to the schema $S_2$ in the mapping $M_{23}$ converts the mapping $M_{23}$ to the mapping $M_{13}$.

2. The method of claim 1, wherein the mapping $M_{13}$ defines the composition of the mappings $M_{12}$ and $M_{23}$ with respect to a relationship semantics.

3. The method of claim 1, wherein said all replacing references to the schema $S_2$ in the mapping $M_{23}$ is implemented by executing a composition-with-rules algorithm comprising:
   initializing a mapping holder R to the mapping $M_{23}$;
   after said initializing, for each SO nested tgd m in R, replacing each top-level set-type element in the SO nested tgd m by a corresponding rule in the rule set $R_{12}$; and
   after said replacing each top-level set-type element in the SO nested tgd m in R, rewriting each SO nested tgd m in R using at least one rewrite rule selected from the group consisting of a union separation rewrite rule, a record projection rewrite rule, a case reduction rewrite rule, and combinations thereof.

4. The method of claim 3, wherein said rewriting comprises for each SO nested tgd m in R:
   executing at least one union separation; and
   de-nesting at least one complex type expression after said executing at least one union separation is performed.

5. A method for generating a schema mapping, said method comprising:
   providing a mapping $M_{12}$ from a schema $S_1$ to a schema $S_2$, said mapping $M_{12}$ relating the schema $S_2$ to the schema $S_1$, said schema $S_1$ and schema $S_2$ each comprising one or more elements, said mapping $M_{12}$ being expressed in terms of at least one second-order nested tuple-generating dependency (SO nested tgd);
   providing a mapping $M_{23}$ from the schema $S_2$ to the schema $S_3$, said mapping $M_{23}$ relating the schema $S_3$ to the schema $S_2$, said schema $S_3$ comprising one or more elements, said mapping $M_{23}$ being expressed in terms of at least one SO nested tgd; and
   generating, by a processor of a computer system, a mapping $M_{13}$ from the schema $S_1$ to the schema $S_3$, said mapping $M_{13}$ relating the schema $S_3$ to the schema $S_1$ that does not expressly recite any element of the schema $S_2$, said generating the mapping $M_{13}$ comprising generating the mapping $M_{13}$ as a composition of the mappings $M_{12}$ and $M_{23}$, wherein the mapping $M_{13}$ defines the composition of the mappings $M_{12}$ and $M_{23}$ with respect to a transformation semantics such that $M_{13}(I_1) = M_{23}(M_{12}(I_1))$ for every instance b over $S_1$, wherein said generating the mapping $M_{13}$ as a composition of the marwincis $M_{12}$ and $M_{23}$ comprises:
   Skolemizinci each SO nested tcid of the marwinci $M_{12}$;
   computing a rule $R_E$ for each element E in the schema $S_2$ that is of set type, wherein the rule $R_E$ describes how data instances of the element E can be created based on the Skolemized SO target tcids that are relevant for the element E, and wherein $R_{12}$ is a rule set denotin the set of all of said rules $R_E$ and
   replacing all references to the schema $S_2$ in the mapping $M_{23}$ with references to the schema $S_1$ using the rule set $R_{12}$, wherein said replacing all references to the schema $S_2$ in the mapping $M_{23}$ converts the mapping $M_{23}$ to the mapping $M_{13}$;
   after said replacing all references to the schema $S_2$ in the mapping $M_{23}$; eliminating in R all Skolem term equalities in which different Skolem functions are equated or in which a Skolem term is equated to a non Skolem term; and
   after said eliminating: reducing the number of variables to a minimal number of logically required variables in a FOR clause of each SO nested tgd in R.

6. The method of claim 5, wherein providing the mapping $M_{12}$ is performed before providing the mapping $M_{23}$ is performed, in accordance with a target schema evolution.

7. The method of claim 5, wherein providing the mapping $M_{12}$ is performed after providing the mapping $M_{23}$ is performed, in accordance with a source schema evolution.

8. The method of claim 5, wherein said replacing all references to the schema $S_2$ in the mapping $M_{23}$ is implemented by executing a composition-with-rules algorithm comprising:
   initializing a mapping holder R to the mapping $M_{23}$;
   after said initializing, for each SO nested tgd m in R, replacing each top-level set-type element in the SO nested tgd m by a corresponding rule in the rule set $R_{12}$; and
   after said replacing each top-level set-type element in the SO nested tgd m in R, rewriting each SO nested tgd m in R using at least one rewrite rule selected from the group consisting of a union separation rewrite rule, a record projection rewrite rule, a case reduction rewrite rule, and combinations thereof.

9. The method of claim 8, wherein said rewriting comprises for each SO nested tgd m in R:
   executing at least one union separation; and
   de-nesting at least one complex type expression after said executing at least one union separation is performed.

10. A computer program product, comprising a computer readable storage medium having a computer readable program code stored therein, said computer readable program code configured to be executed by a processor of a computer system to implement a method for generating a schema mapping, said method comprising:
   providing a mapping $M_{12}$ from a schema $S_1$ to a schema $S_2$, said mapping $M_{12}$ relating the schema $S_2$ to the schema $S_1$, said schema $S_1$ and schema $S_2$ each comprising one or more elements, said mapping $M_{12}$ being expressed in terms of at least one second-order nested tuple-generating dependency (SO nested tgd);
   providing a mapping $M_{23}$ from the schema $S_2$ to the schema $S_3$, said mapping $M_{23}$ relating the schema $S_3$ to the schema $S_2$, said schema $S_3$ comprising one or more elements, said mapping $M_{23}$ being expressed in terms of at least one SO nested tgd; and
   generating a mapping $M_{13}$ from the schema $S_1$ to the schema $S_3$, said mapping $M_{13}$ relating the schema $S_3$ to the schema $S_1$, said mapping $M_{13}$ being expressed in terms of at least one SO nested tgd that does not expressly recite any element of the schema $S_2$, said generating the mapping $M_{13}$ comprising generating the mapping $M_{13}$ as a composition of the mappings $M_{12}$ and $M_{23}$,wherein at least one schema of the schemas $S_1$ and $S_2$ comprises at least one complex type expression nested inside another complex type expression, wherein said generating the mapping $M_{13}$ as a composition of the mappings $M_{12}$ and $M_{23}$ comprises:
   Skolemizing each SO nested tgd of the mapping $M_{12}$;
   computing a rule $R_E$ for each element E in the schema $S_2$ that is of set type, wherein the rule $R_E$ describes how data instances of the element E can be created based on the Skolemized SO target tgds that are relevant for the element E, and wherein $R_{12}$ is a rule set denoting the set of all of said rules $R_E$ and
   replacing all references to the schema $S_2$ in the mapping $M_{23}$ with references to the schema $S_1$ using the rule set $R_{12}$, wherein said replacing all references to the schema $S_2$ in the mapping $M_{23}$ converts the mapping $M_{23}$ to the mapping $M_{13}$.

11. The computer program product of claim 10, wherein said all replacing references to the schema $S_2$ in the mapping $M_{23}$ is implemented by executing a composition-with-rules algorithm comprising:

initializing a mapping holder R to the mapping $M_{23}$;

after said initializing, for each SO nested tgd m in R, replacing each top-level set-type element in the SO nested tgd m by a corresponding rule in the rule set $R_{12}$; and after said replacing each top-level set-type element in the SO nested tgd m in R, rewriting each SO nested tgd m in R using at least one rewrite rule selected from the group consisting of a union separation rewrite rule, a record projection rewrite rule, a case reduction rewrite rule, and combinations thereof.

12. The method of claim 11, wherein said rewriting comprises for each SO nested tgd m in R:

executing at least one union separation; and de-nesting at least one complex type expression after said executing at least one union separation is performed.

13. The method of claim 10, wherein the mapping $M_{13}$ defines the composition of the mappings $M_{12}$ and $M_{23}$ with respect to a relationship semantics.

14. A computer program product, comprising a computer readable storage medium having a computer readable program code stored therein, said computer readable program code configured to be executed by a processor of a computer system to implement a method for generating a schema mapping, said method comprising:

providing a mapping $M_{12}$ from a schema $S_1$ to a schema $S_2$, said mapping $M_{12}$ relating the schema $S_2$ to the schema $S_1$, said schema $S_1$ and schema $S_2$ each comprising one or more elements, said mapping $M_{12}$ being expressed in terms of at least one second-order nested tuple-generating dependency (SO nested tgd);

providing a mapping $M_{23}$ from the schema $S_2$ to the schema $S_3$, said mapping $M_{23}$ relating the schema $S_3$ to the schema $S_2$, said schema $S_3$ comprising one or more elements, said mapping $M_{23}$ being expressed in terms of at least one SO nested tgd; and generating a mapping $M_{13}$ from the schema $S_1$ to the schema $S_3$, said mapping $M_{13}$ relating the schema $S_3$ to the schema $S_1$ that does not expressly recite any element of the schema $S_2$, said generating the mapping $M_{13}$ comprising generating the mapping $M_{13}$ as a composition of the mappings $M_{12}$ and $M_{23}$, wherein the mapping $M_{13}$ defines the composition of the mappings $M_{12}$ and $M_{23}$ with respect to a transformation semantics such that $M_{13}(I_1) = M_{23}(M_{12}(I_i))$ for every instance $I_i$ over $S_1$, wherein said generating the main $M_{13}$ as a composition of the ma in s $M_{12}$ and $M_{23}$ comprises:

Skolemizing each SO nested tgd of the mapping $M_{12}$;

computing a rule $R_E$ for each element E in the schema $S_2$ that is of set type, wherein the rule $R_E$ describes how data instances of the element E can be created based on the Skolemized SO tarciet tcids that are relevant for the element E and wherein $R_{12}$ is a rule set denoting the set of all of said rules $R_E$ and replacinci all references to the schema $S_2$ in the mapping $M_{23}$ with references to the schema $S_1$ using the rule set $R_{12}$, wherein said replacing all references to the schema $S_2$ in the mapping $M_{23}$ converts the mapping $M_{23}$ to the mapping $M_{13}$;

after said replacing all references to the schema $S_2$ in the mapping $M_{23}$: eliminating in R all Skolem term equalities in which different Skolem functions are equated or in which a Skolem term is equated to a non Skolem term; and after said eliminating: reducing the number of variables to a minimal number of logically required variables in a FOR clause of each SO nested tgd in R.

15. The computer program product of claim 14, wherein said replacing all references to the schema $S_2$ in the mapping $M_{23}$ is implemented by executing a composition-with-rules algorithm comprising:

initializing a mapping holder R to the mapping $M_{23}$;

after said initializing, for each SO nested tgd m in R, replacing each top-level set-type element in the SO nested tgd m by a corresponding rule in the rule set $R_{12}$; and after said replacing each top-level set-type element in the SO nested tgd m in R, rewriting each SO nested tgd m in R using at least one rewrite rule selected from the group consisting of a union separation rewrite rule, a record projection rewrite rule, a case reduction rewrite rule, and combinations thereof.

16. The method of claim 15, wherein said rewriting comprises for each SO nested tgd m in R:

executing at least one union separation; and de-nesting at least one complex type expression after said executing at least one union separation is performed.

17. The method of claim 14, wherein providing the mapping $M_{12}$ is performed before providing the mapping $M_{23}$ is performed, in accordance with a target schema evolution.

18. The method of claim 14, wherein providing the mapping $M_{12}$ is performed after providing the mapping $M_{23}$ is performed, in accordance with a source schema evolution.

* * * * *